US011356562B2

(12) United States Patent
Krochmal et al.

(10) Patent No.: US 11,356,562 B2
(45) Date of Patent: Jun. 7, 2022

(54) TRANSFERRING AN ACTIVE TELEPHONE CONVERSATION

(71) Applicant: Apple Inc., Cupertino, CA (US)

(72) Inventors: Marc J. Krochmal, Santa Clara, CA (US); John J. Iarocci, Los Gatos, CA (US); Alex D. Sanciangco, San Jose, CA (US); Patrick L. Coffman, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 112 days.

(21) Appl. No.: 16/568,786

(22) Filed: Sep. 12, 2019

(65) Prior Publication Data

US 2020/0382647 A1 Dec. 3, 2020

Related U.S. Application Data

(60) Provisional application No. 62/855,141, filed on May 31, 2019.

(51) Int. Cl.
*H04M 3/58* (2006.01)
*H04M 3/54* (2006.01)
*H04M 3/42* (2006.01)

(52) U.S. Cl.
CPC ......... *H04M 3/58* (2013.01); *H04M 3/42263* (2013.01); *H04M 3/54* (2013.01)

(58) Field of Classification Search
None
See application file for complete search history.

(56) References Cited

U.S. PATENT DOCUMENTS

| 9,491,033 | B1* | 11/2016 | Soyannwo | H04W 4/026 |
| 2009/0029690 | A1* | 1/2009 | Levien | H04W 4/16 455/417 |
| 2013/0115932 | A1* | 5/2013 | Williams | H04M 3/58 455/417 |
| 2015/0128194 | A1* | 5/2015 | Kuang | H04N 21/41407 725/81 |
| 2016/0065709 | A1* | 3/2016 | Lee | H04W 4/80 455/420 |
| 2018/0081523 | A1* | 3/2018 | Beaumont | H04M 1/02 |
| 2020/0029167 | A1* | 1/2020 | Bostick | H04R 1/1083 |

* cited by examiner

*Primary Examiner* — Antim G Shah
(74) *Attorney, Agent, or Firm* — Invoke

(57) ABSTRACT

According to one embodiment, a computing device may conduct an active telephone conversation and a proximity of the computing device to a second computing device may be determined to be within a predetermined distance. Moreover, a determination of a capability of the second computing device to conduct a telephone conversation may be made, and in response to such determinations, the active telephone conversation may be transferred from the computing device to the second computing device. In an example, when a user holding a telephone conversation moves near a smart speaker, the telephone conversation may be transferred to the smart speaker from the user's mobile device, should the user desire such a transfer. Moreover, as the user moves around, the telephone conversation may move with the user from device to device, enabling a seamless and intuitive telephone conversation experience for the user.

18 Claims, 10 Drawing Sheets

TRANSFERRING AN ACTIVE TELEPHONE CONVERSATION

TECHNICAL FIELD

The disclosure generally relates to managing telephone conversations, and more particularly to transferring an active telephone conversation from one device to another device while continuing the conversation.

BACKGROUND

Many people have smart devices that are capable of providing certain functions, that may be complemented with additional functions from online accessible marketplaces. Some smart devices may be capable of responding to commands and providing responses, such as via the use of speakers and microphones. For example, a user of a smart device may purchase goods and services, search for words or phrases, play or stream music, display images, play or stream videos, etc. In addition, these smart devices may be used to communicate with other devices that are configured to share data, messages, etc.

SUMMARY

In some implementations, a computing device may conduct an active telephone conversation and a proximity of the computing device to a second computing device may be determined to be within a predetermined distance. Moreover, a determination of a capability of the second computing device to conduct a telephone conversation may be made, and in response to such determinations, the active telephone conversation may be transferred from the computing device to the second computing device.

Particular implementations provide at least the following advantages. When a user conducting a telephone conversation on a mobile telephone moves to a location where one or more smart speaker devices are located, it is beneficial for the active telephone conversation to be transferred to a closest of the smart speaker devices for continuation on the closest smart speaker device, should the user desire such a transfer. By conducting the telephone conversation on a smart speaker, the user is able to dispose of the mobile telephone, freeing up the user's hands for other tasks. Moreover, as the user moves around an area, the active telephone conversation may move with the user, enabling a seamless and intuitive telephone conversation experience for the user. Additionally, should the user remove the mobile telephone from the location of the smart speakers, the telephone conversation may be transferred back to the mobile telephone, allowing the conversation to continue to move with the user outside of the location. The transfer of this telephone conversation from device to device may be performed automatically without user interaction in some approaches.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Smart speakers are becoming more and more commonly installed in homes, offices, and other familiar places for people. Having these smart speakers installed allows a person to interact with the smart speaker when at the familiar place. Some example interactions include requesting and receiving information through a voice-responsive interface using voice commands, controlling compatible devices with voice commands, receiving audible updates and reminders, etc. Sometimes, a person may arrive at a location where a smart speaker is installed while conducting a telephone conversation on a mobile telephone. It may be convenient for the person to be able to continue the telephone conversation while at the location using the smart speaker, with the smart speaker acting as a speakerphone and microphone for the person to be able to conduct the telephone conversation.

Figure 1:
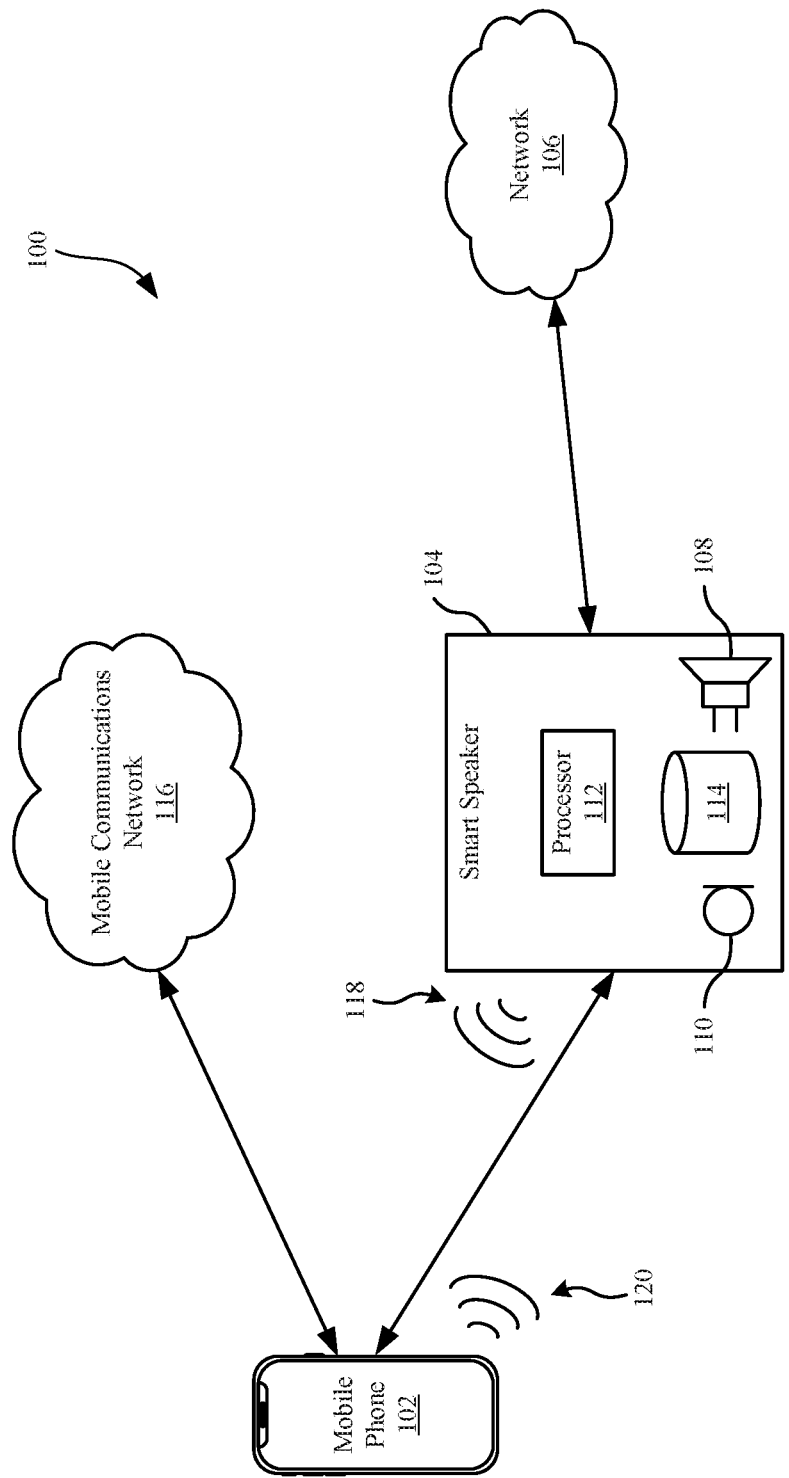
FIG. 1 shows a system for transferring an active telephone conversation between devices, in one example.

With reference to FIG. 1, a system 100 for managing telephone conversations is shown in one embodiment. In particular, system 100 may be used to transfer an active telephone conversation between computing devices. The system 100 includes a mobile telephone device 102 in electrical communication with a smart speaker device 104. The system 100 is designed to provide convenience to a user engaged in the active telephone conversation on the mobile telephone device 102 when the telephone device 102 is brought within a predetermined proximity to (e.g., closer than a threshold distance, referred to herein as being "proximate to") the smart speaker device 104. The discovery of the mobile telephone device 102 being brought within the predetermined proximity to the smart speaker device 104 may trigger the telephone conversation to be transferred to the smart speaker device 104 from the mobile telephone device 102. Thereafter, the user may continue the telephone conversation with the smart speaker device 104 without any further interaction with the mobile telephone device 102.

As used herein, a mobile telephone device 102 is a computing device configured to communicate via one or more cellular and/or satellite communication systems (e.g., the mobile communications network 116). Although a mobile telephone device 102 is shown in FIG. 1, the system 100 is not restricted to use with mobile telephones, as any computing device capable of communicating via one or more mobile communications networks 116 to conduct a telephone conversation may be used in system 100, such as a smartphone, a satellite phone, a laptop computer, a tablet computer, etc.

Mobile communication networks 116, such as cellular and satellite communication systems, are connected to the public switched telephone network (PSTN) to interconnect mobile telephone devices 102 with landline telephone devices. The mobile telephone devices 102 are configured to communicate with other telephone devices, mobile and landline, via one or more mobile communications networks 116 using common protocols, such as Time Division Multiple Access (TDMA), Code Division Multiple Access (CDMA), Global System for Mobile communications (GSM), General Packet Radio Service (GPRS), Broadband Global Area Network (BGAN), Very Small Aperture Terminal (VSAT), etc.

Moreover, a smart speaker device 104, as used herein, describes a computing device that includes a speaker 108, a microphone 110, a processor 112, and a memory 114. The smart speaker device 104 is configured to receive voice commands from a user or audible commands from another computing device, process the received commands, and audibly respond to the commands according to preconfigured routines. Although a smart speaker device 104 is shown in FIG. 1, the system 100 is not restricted to use with smart speakers, as any computing device capable of communicating wirelessly (e.g., via Bluetooth, Wi-Fi, etc.) with the mobile telephone device 102 may be used in system 100, such as a Bluetooth speaker, a home automation controller, a server device, a router, etc.

In some approaches, the smart speaker device 104 may also include an interface for connecting online to a network 106 (e.g., the Internet) and/or to the mobile telephone device 102 to obtain additional resources and information, including downloading additional routines for expanding functionality of the smart speaker device 104. Moreover, the memory 114 may be used to store the preconfigured routines, and any additional routines, information, and data downloaded to the smart speaker device 104 via network 106 or the mobile telephone device 102.

In one approach, the smart speaker device 104 may also include a display for visually presenting information to a user, such as images, graphics, text, etc., that enable a user to better understand a response to a command or provide information visually that is not easily provided audibly. In a further approach, the display may be touch-sensitive, such that the user may interact with the display to control the smart speaker device 104 and navigate through information presented on the display.

The smart speaker device 104 is configured to receive commands and respond to the received commands in a predefined way. For example, when a user asks for the weather, the smart speaker device may relay a current temperature and/or weather, and in some cases future expected temperatures and/or weather patterns. In another example, when a user commands a smart speaker device to turn on a lightbulb using a command that is preconfigured with the smart speaker device, the light bulb may be turned on or instructed to turn on by the smart speaker device. In another example, if the smart speaker device is configured with a touch sensitive display, when the user inputs a command via the display to launch an interactive game application on the smart speaker device, the smart speaker device may launch the interactive game application and proceed to receive input from the user via the touch-sensitive display and/or via voice commands.

As used herein, an active telephone conversation describes a telephone conversation that has been started on the mobile telephone device 102. In one example, the telephone conversation may have been started on the mobile telephone device 102 by placing an outgoing call initiated by dialing a phone number and connecting to another telephone device having the phone number. In another example, the telephone conversation may have been started on another telephone device, and connected with the mobile telephone device 102 via an incoming call that is received and authorized on the mobile telephone device 102 (e.g., the incoming call is not rejected by the mobile telephone device 102). In either example, the telephone conversation remains active because neither telephone device has hung up on the call, keeping the connection between the devices operable.

In an example, conducting an active telephone conversation may refer to a device (e.g., smartphone, smart speaker, etc.) which is configured to directly or indirectly connect to a mobile communications network 116, receive voice input from a user, provide audio output to the user, and maintain a connection with a second telecommunications device through the mobile communications network 116 until the call is terminated.

In another example, conducting an active telephone conversation may refer to a device (e.g., smartphone, smart speaker, etc.) which is configured to conduct a telephone conversation using Voice over Internet Protocol (VOIP) to conduct a telephone conversation over IP networks, such as the Internet. In more examples, one or more different types of Internet telephony, broadband telephony, broadband phone service, etc., may be used to provide communications services over the Internet.

In one implementation, smart speaker device 104 may be configured to conduct a telephone conversation without aid from any other device. In one example, smart speaker device 104 may utilize VOIP to conduct a telephone conversation over IP networks, such as the Internet. In more examples, one or more different types of Internet telephony, broadband telephony, broadband phone service, etc., may be used to provide communications services over the Internet.

In some implementations, the mobile telephone device 102 may transfer an active telephone conversation to the smart speaker device 104 in response to a trigger. For example, the mobile telephone device 102 may receive a wireless signal 118 broadcast from the smart speaker device 104. The wireless signal 118 may be of any type known in the art, such as Bluetooth, Wi-Fi, near field communication (NFC), ultra wideband (UWB), a sound wave audible to humans, a sound wave inaudible to humans, etc. For example, the smart speaker device 104 may broadcast a wireless signal 118 so that other devices, such as mobile telephone device 102, are able to find and connect to the smart speaker device 104. The wireless signal 118 may be broadcast periodically, or in response to a condition or trigger.

Mobile telephone device 102 may determine, based on the wireless signal 118, that the mobile telephone device 102 is within a predetermined proximity 142 of (e.g., closer than a threshold distance to, proximate to) the smart speaker device 104. In an example, being within this proximity may indicate that the mobile telephone device 102 is at a same location as the smart speaker device 104, such as in a same room, within a same structural building (e.g., a home, a business, a store, etc.), or within a same region of a larger structural space (e.g., in a northwest corner of a large auditorium, located centrally in a convention hall, at a specific gate of an airport or bus terminal, etc.), depending on the proximity 142 chosen or selected by a configuration of the smart speaker device 104.

In some implementations, in response to determining that the mobile telephone device 102 is in proximity to the smart speaker device 104, the mobile telephone device 102 may present a graphical user interface that a user may interact with to initiate a transfer of the active telephone conversation between the mobile telephone device 102 and the smart speaker device 104, as described in detail below.

In some more implementations, in response to determining that the mobile telephone device 102 is proximate to the smart speaker device 104 and that the mobile telephone device 102 is in a resting position (e.g., on a table, horizontal, not moving, currently charging, etc.), the mobile telephone device 102 may automatically initiate a transfer of the active telephone conversation to the smart speaker device 104, as described in detail below.

In some implementations, other criteria (e.g., other than resting position) may trigger the automatic transfer of the active telephone conversation. For example, the mobile telephone device 102 may automatically transfer the active telephone conversation being conducted on the mobile telephone device 102 to the smart speaker device 104 in response to detecting that the mobile telephone device 102 is in proximity to another computing device (e.g., a wireless router, a laptop computer, a server device, a home automation controller, etc.) located at a certain place familiar to the user. The user may pre-configure the mobile telephone device 102 to automatically transfer the active telephone conversation from the mobile telephone device 102 to the smart speaker device 104 in response to detecting that the mobile telephone device 102 has received a device identifier corresponding to the other computing device in a broadcast signal and/or when the mobile telephone device 102 is proximate to the other computing device. For example, the user can configure mobile telephone device 102 to automatically transfer the active telephone conversation to the smart speaker device 104 when the mobile telephone device 102 is proximate to the user's wireless router at home or the user's desktop computer in the user's office.

Similarly, mobile telephone device 102 may automatically transfer the active telephone conversation from the mobile telephone device 102 to the smart speaker device 104 in response to wirelessly receiving an identifier of the smart speaker device 104 and detecting that the mobile telephone device 102 is proximate to the smart speaker device 104. The user may configure the mobile telephone device 102 to automatically transfer the active telephone conversation to the smart speaker device 104 when the smart speaker device 104 indicates that it is capable of conducting a telephone conversation, such as by broadcasting a device type identifier corresponding to a particular type of smart speaker capable of conducting telephone conversations in a broadcast signal and/or when the mobile telephone device 102 is proximate to the smart speaker device 104. For example, the user may configure the mobile telephone device 102 to automatically transfer the active telephone conversation to the smart speaker device 104 in response to returning home where the smart speaker device 104 is located and receiving a broadcast or direct message from the smart speaker device 104 indicating that the smart speaker device 104 is available for conducting a telephone conversation.

In some implementations, the mobile telephone device 102 may automatically transfer the active telephone conversation from the mobile telephone device 102 to the smart speaker device 104 in response to detecting that the mobile telephone device 102 is right next to the smart speaker device 104. For example, the mobile telephone device 102 may be configured with a proximity threshold distance, as described above, and a second threshold distance that is less than the proximity threshold distance. The second threshold distance may be used to determine when the mobile telephone device 102 is right next to the smart speaker device 104, instead of being in a proximity to the smart speaker device. For example, the second threshold distance may be in a range from about 5 centimeters (cm) to about 60 cm, such as 10 cm, 20 cm, 30 cm, etc. For example, the mobile telephone device 102 may automatically transfer the active telephone conversation when the mobile telephone device 102 determines that the mobile telephone device 102 is within 30 cm of the smart speaker device 104.

In one approach, mobile telephone device 102 may automatically transfer the active telephone conversation from the mobile telephone device 102 to the smart speaker device 104 based on past behavioral patterns of the user of the mobile telephone device 102. For example, if a user typically transfers a telephone conversation to the smart speaker when the user returns home and is conducting a telephone conversation, the transfer may be made automatically without requiring user input once a proximity of the mobile telephone device 102 to the smart speaker device 104 is less than the proximity threshold distance. In this way, the system 100 may learn from past user behavior to best manage an active telephone conversation when opportunities exist to make conducting the telephone conversation easier for the user.

Any of the above described actions may be implemented on the smart speaker device 104, such as by using wireless signal 120 transmitted by the mobile telephone device 102 to determine a proximity of the mobile telephone device 102 to the smart speaker device 104. The wireless signal 120 may be of any type known in the art, such as Bluetooth, Wi-Fi, NFC, UWB, a sound wave audible to humans, a sound wave inaudible to humans, etc.

In some implementations, the smart speaker device 104 may request transfer of the active telephone conversation from the mobile telephone device 102 in response to a trigger. For example, the smart speaker device 104 may receive a wireless signal 120 broadcast from the mobile telephone device 102. For example, the mobile telephone device 102 may broadcast a wireless signal so that other devices, such as smart speaker device 104, are able to find and connect to the mobile telephone device 102. Smart speaker device 104 may determine, based on the wireless signal 120, that the smart speaker device 104 is within a predetermined proximity of (e.g., closer than a threshold distance to, proximate to) the mobile telephone device 102. This proximity may indicate that the smart speaker device 104 is at a same location as the mobile telephone device 102, such as in a same room, within a same structural building, (e.g., a home, a business, a store, etc.), or within a same region of a larger structural space (e.g., in a northwest corner of a large auditorium, located centrally in a convention hall, at a specific gate of an airport or bus terminal, etc.)

In some implementations, in response to determining that the mobile telephone device 102 is in proximity to the smart speaker device 104, the smart speaker device 104 may present a graphical user interface on a display of the smart speaker device 104 that a user may interact with to initiate a transfer of the active telephone conversation from the mobile telephone device 102 to the smart speaker device 104. In another approach, the smart speaker device 104 may request the mobile telephone device to present a graphical user interface that a user may interact with to initiate a transfer of the active telephone conversation from the mobile telephone device 102 to the smart speaker device 104.

In some implementations, other criteria (e.g., other than proximity) may trigger the automatic transfer of the active telephone conversation. For example, the smart speaker device 104 may automatically transfer the active telephone conversation being conducted on the mobile telephone device 102 to the smart speaker device 104 in response to detecting that another computing device (e.g., a smart tag, a laptop computer, a playback device, a tablet computer, etc.) is in proximity to the smart speaker device 104. The user may pre-configure the smart speaker device 104 to automatically transfer the active telephone conversation from the mobile telephone device 102 to the smart speaker device 104 in response to receiving a device identifier corresponding to the other computing device in a broadcast signal and/or when the other computing device is proximate to the smart speaker device 104. For example, the user can configure the smart speaker device 104 to automatically transfer the active telephone conversation when the smart speaker device 104 is proximate to a smart tag attached to the user's keychain or the user's tablet computer is brought into the user's home proximate to the smart speaker device 104.

In another implementation, in response to determining that the mobile telephone device 102 is in a talking position (e.g., placed to an ear of a user, moved to a vertical position after having been in a horizontal position for an extended period of time, such as greater than about 1 minute, removed from a charging source, gripped by a user's hand, etc.), the mobile telephone device 102 may automatically initiate a transfer of the active telephone conversation back from the smart speaker device 104. In another approach, the smart speaker device 104 may automatically initiate a transfer of the active telephone conversation back to the mobile telephone device 102 from the smart speaker device 104.

In some examples, a trigger that leads to a transfer of the telephone conversation from one computing device to another computing device may be based on a proximity of the user to the various computing devices. The location of the user may be determined and/or estimated using any technique known in the art.

In one example, a proximity of the user to a computing device may be determined based on a volume (e.g., decibel level) of sound(s) caused by the user. Some example sounds include, but are not limited to, talking, yelling, laughing, coughing, whispering, shuffling feet, stomping, jumping, walking, typing on a keyboard, moving objects (like papers, boxes, furniture, etc.), and interacting with another device (like a television, radio, music player, computer, dishwasher, refrigerator, etc.). One or more of the computing devices may determine a decibel level of a detected sound, and the computing device which registers a higher decibel level may be determined to be a closer computing device to the user. If only one computing device detects the sound, then it may assume that it is the closest computing device to the user. In a further approach, a computing device may be configured to distinguish between different sounds, such that sounds from the user are tracked as the user moves through an area, and other sounds unrelated to the user are ignored for the calculations to track the user's movements.

In another example, a user may designate which computing device to conduct a telephone conversation using an audible command which identifies the designated computing device, such as by saying "transfer call to living room speaker," "move call to bedroom," "conduct conversation on laptop," etc. In response to such a command being received by any computing device, an active telephone conversation may be transferred according to the user's command when the designated computing device is capable of conducting the telephone conversation.

In another example, a proximity of the user to a computing device may be determined based on a detectable position of a secondary computing device typically worn or carried by the user (such as a smartwatch, activity tracker, smart tag, mobile telephone, table computer, media player, smartphone, laptop computer, etc.). The position of the secondary computing device may be detected based on use of a common network (such as Wi-Fi), geolocation information, or some other method known in the art.

Figure 2A:
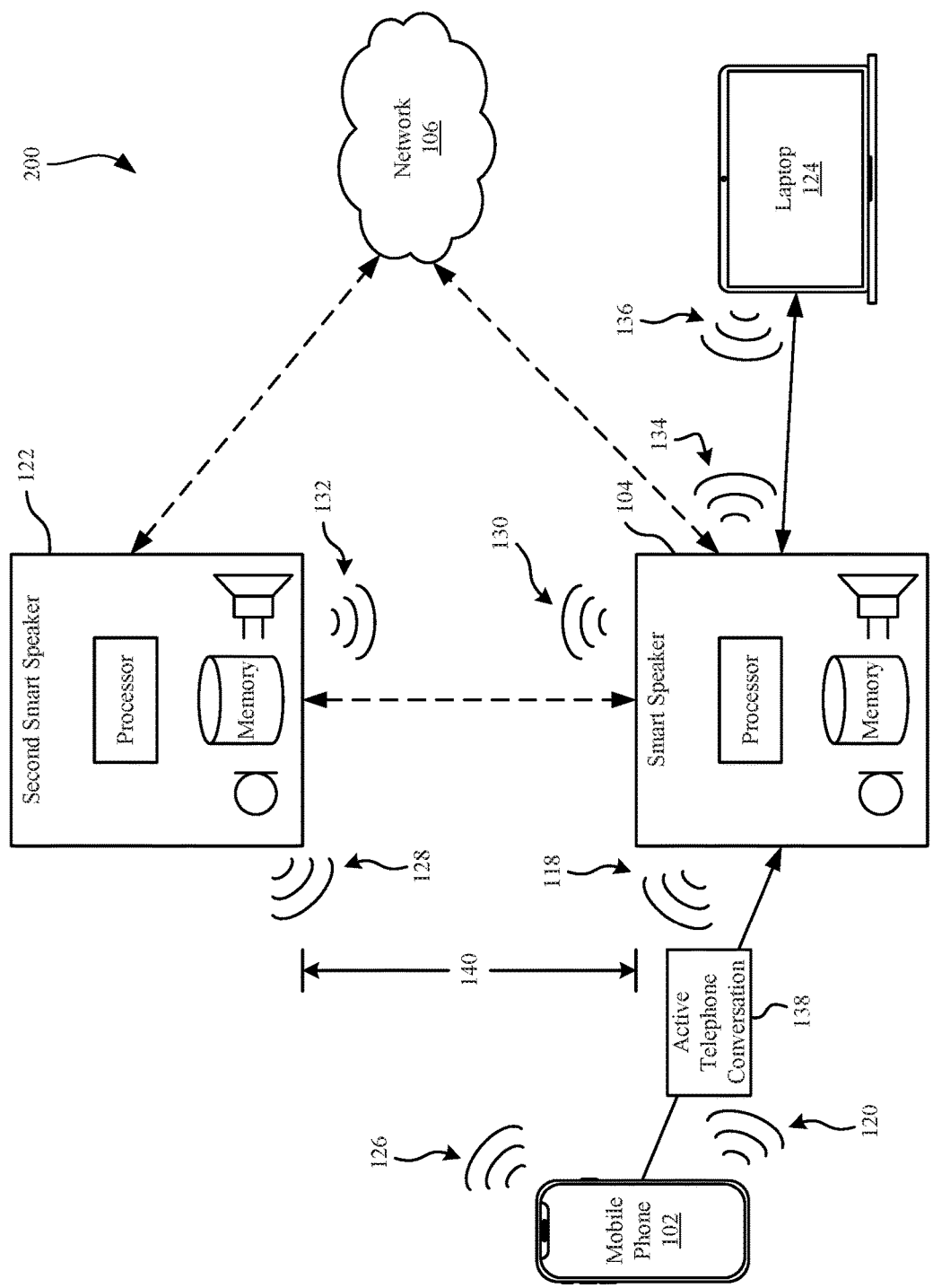
FIGS. 2A-2C show a system for managing an active telephone conversation in several examples.
Figure 2B:
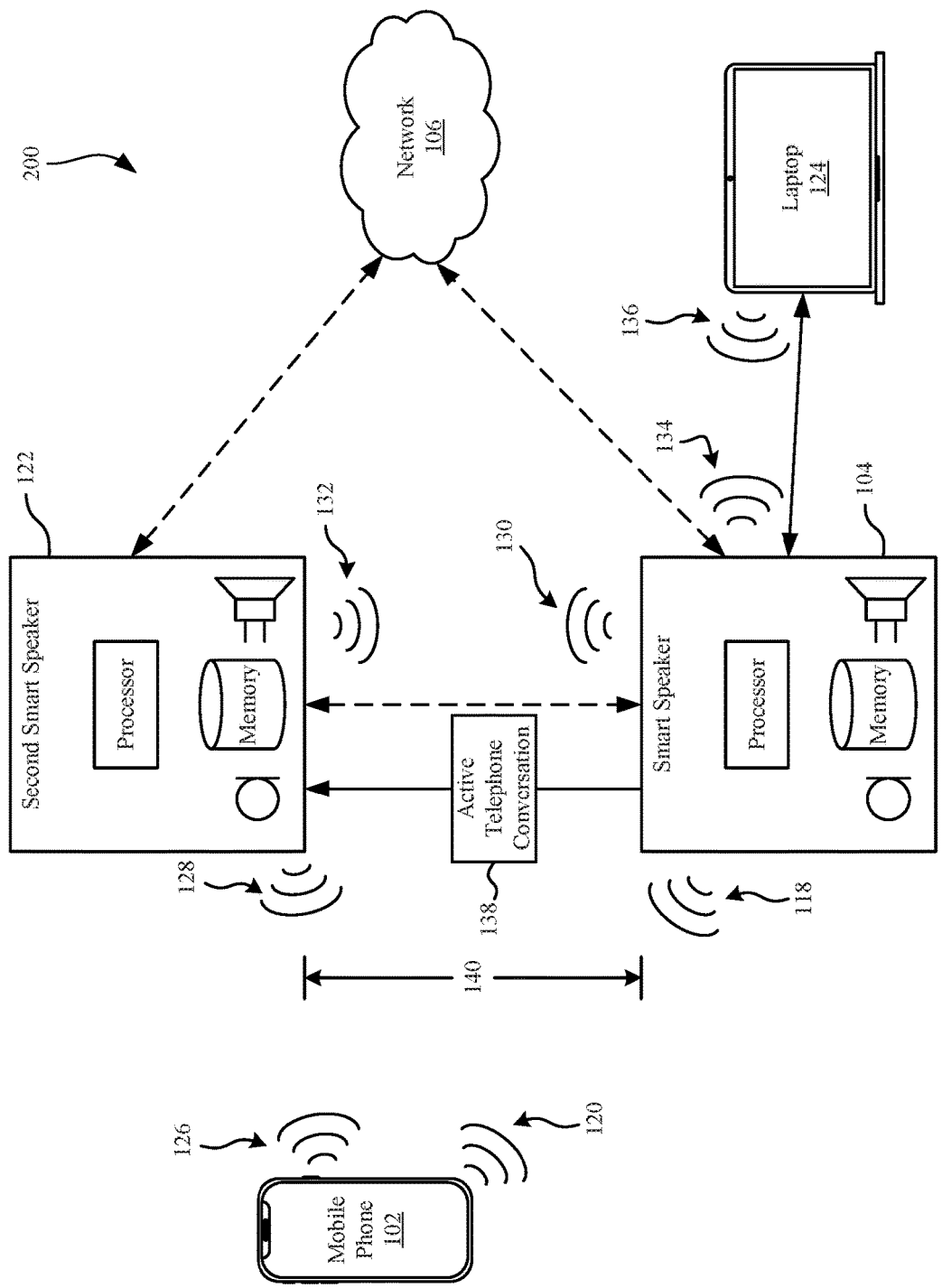
Figure 2C:
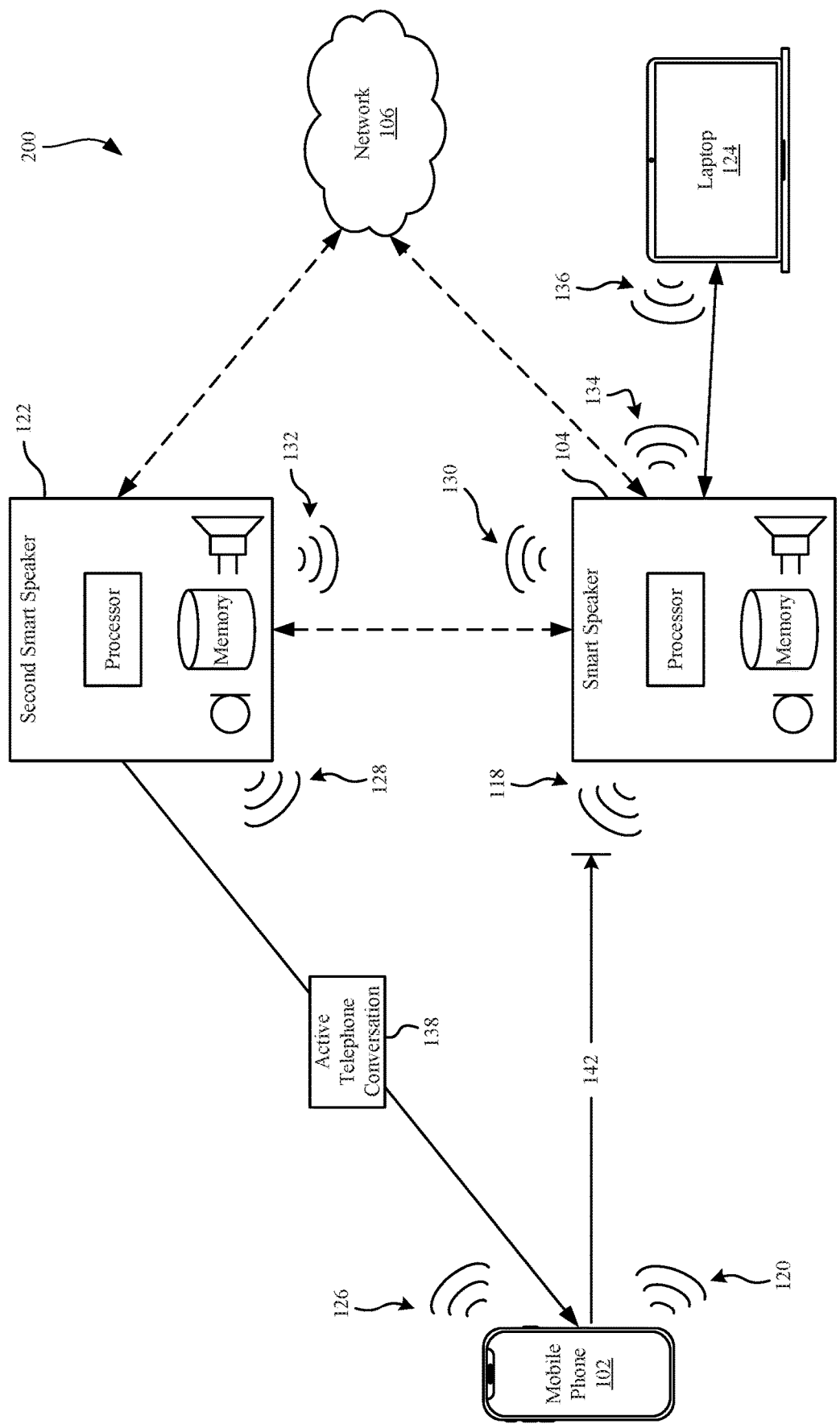

Now referring to FIGS. 2A-2C, a system 200 for managing an active telephone conversation 138 is shown in one example. In particular, system 200 may be used to transfer the active telephone conversation 138 between computing devices. The system 200 includes the mobile telephone device 102 in electrical communication with the smart speaker device 104. The system 200 also includes a second smart speaker device 122 and a laptop computer 124 in electrical communication with the smart speaker device 104. The second smart speaker device 122 may be wirelessly connected to the smart speaker device 104 in some examples.

As used herein, a laptop computer 124 is a computing device configured to communicate wirelessly (e.g., via Bluetooth, Wi-Fi, etc.) with the smart speaker device 104 and provide input to the smart speaker device 104. In one example, the laptop computer 124 may also receive data and/or commands from the smart speaker device 104. Although a laptop computer 124 is shown in FIG. 2, the system 200 is not restricted to use with laptop computers, as any computing device capable of connecting wirelessly or via a wired connection to the smart speaker device 104 and communicating with the first smart speaker device 104 may be used in system 200, such as a smartphone, a satellite phone, a desktop computer, a server device, a tablet computer, a router, etc.

System 200 is designed to provide convenience to a user engaged in an telephone conversation 138 on the mobile telephone device 102 when the telephone device 102 is brought within a predetermined proximity to the smart speaker devices 104, 122. The smart speaker devices 104, 122 are separated from one another by a distance 140, such that a distance between the mobile telephone device 102 and the smart speaker device 104 is not necessarily the same as a distance between the mobile telephone device 102 and the second smart speaker device 122. In other words, the mobile telephone device 102 may be proximate to one of the smart speaker devices without being proximate to the other smart speaker device.

The laptop computer 124, in one example, may be used to configure the smart speaker device 104. Some example configuration operations include managing user profiles, setting preferences, registering devices for communication with the smart speaker device 104, setting conditions/triggers for transferring telephone conversations automatically, etc.

In some approaches, the laptop computer 124 may also be configured to conduct a telephone conversation. In one example, laptop computer 124 may utilize VOIP or some other type of Internet telephony, broadband telephony, broadband phone service, etc., to conduct a telephone conversation over IP networks, such as the Internet. Such capability may be discovered by the smart speaker device 104 by sending a signal 134 (wirelessly or via a wired connection) to the laptop computer 124. The laptop computer 124 may process information included in the signal 134, and in response to processing content of the signal 134, respond with a signal 136 that describes capabilities of the laptop computer 124, including whether the laptop computer 124 is configured to conduct a telephone conversation. Wireless signals 134, 136 may be of any type known in the art, such as Bluetooth, Wi-Fi, NFC, UWB, a sound wave audible to humans, a sound wave inaudible to humans, etc.

The signal 134 from the smart speaker device 104 may include a device identifier for the smart speaker device 104, conditions/triggers that dictate when a telephone conversation is transferred to the laptop computer 124, and/or conditions/triggers that cause the laptop computer 124 to transfer the telephone conversation back to the smart speaker device 104 or the mobile telephone device 102, or to some other device in system 200.

The signal 136 from the laptop computer 124 may include a device identifier for the laptop computer 124, an indication that a telephone conversation may be conducted by the laptop computer 124, and/or conditions/triggers that cause the laptop computer 124 to transfer the telephone conversation back to the smart speaker device 104 or the mobile telephone device 102, or to some other device in system 200.

If the laptop computer 124 responds with a signal 136 that indicates it cannot conduct a telephone conversation, or does not send a signal 136 back to the smart speaker device 104, the smart speaker device 104 may determine that the laptop computer 124 is incapable of conducting a telephone conversation and not consider the laptop computer 124 when determining where to transfer an active telephone conversation 138.

In an example, a proximity of the mobile telephone device 102 to the smart speaker device 104 may be determined by the mobile telephone device 102, at any given time, based on calculation of a signal strength of the signal 118 sent from the smart speaker device 104, according to well-known processes.

In one example, a proximity of the mobile telephone device 102 to the second smart speaker device 122 may be determined by the mobile telephone device 102 based on calculation of a signal strength of the signal 128 sent from the second smart speaker device 122, according to well-known processes. Wireless signal 128 may be of any type known in the art, such as Bluetooth, Wi-Fi, NFC, UWB, a sound wave audible to humans, a sound wave inaudible to humans, etc.

In an example, a proximity of the mobile telephone device 102 in relation to the smart speaker devices 104, 122 may be determined by the mobile telephone device 102 based on a comparison of the signal strength of the signal 118 sent from the smart speaker device 104 and the signal strength of the signal 128 sent from the second smart speaker device 122.

In another approach, one or both of the smart speaker devices 104, 122 may carry out strength of signal calculations to determine which smart speaker device is closer to the mobile telephone device 102 or within a predetermined proximity to the mobile telephone device 102. The second smart speaker device 122 performs a strength of signal calculation based on the wireless signal 126 sent from the mobile telephone device 102, while the smart speaker device 104 performs a strength of signal calculation based on the wireless signal 120 sent from the mobile telephone device 102. Wireless signal 126 may be of any type known in the art, such as Bluetooth, Wi-Fi, NFC, UWB, a sound wave audible to humans, a sound wave inaudible to humans, etc. After these strength of signal calculations have been performed, each smart speaker device may share its own calculation with one another regarding a proximity to the mobile telephone device 102 to determine which smart speaker device is closer. In another example, one of the smart speaker devices 104, 122 may determine that it is proximate to the mobile telephone device 102 based on its own strength of signal calculation.

In another approach, a time-of-flight (ToF) calculation may be used to determine which of the smart speaker devices 104, 122 is closest to the mobile telephone device 102 at any given time, according to well-known processes. The ToF calculation may be implemented on the mobile telephone device 102 based on signal 118 and signal 128, in one approach.

In another approach, one or both of the smart speaker devices 104, 122 may carry out ToF calculations to determine which smart speaker device is closer to the mobile telephone device 102 or within a predetermined proximity to the mobile telephone device 102. The second smart speaker device 122 performs a ToF calculation based on the wireless signal 126 sent from the mobile telephone device 102, while the smart speaker device 104 performs a ToF calculation based on the wireless signal 120 sent from the mobile telephone device 102. After these ToF calculations have been performed, each smart speaker device may share its own calculation with one another regarding a proximity to the mobile telephone device 102 to determine which smart speaker device is closer. In another example, one of the smart speaker devices 104, 122 may determine that it is proximate to the mobile telephone device 102 based on its own ToF calculation.

According to another example, a setting (e.g., a default) may be chosen that dictates which of the smart speaker devices 104, 122 to transfer an active telephone conversation 138 when both smart speaker devices 104, 122 are within a threshold distance to the mobile telephone device 102.

An identification of a transmitting device and preliminary or rudimentary information regarding capabilities of the transmitting device may be discovered by one of the various devices in system 200 using one of the various wireless signals transmitted therebetween. For example, the smart speaker device 104 may include a device identifier in a first message sent in the wireless signal 118 to the mobile telephone device 102. The mobile telephone device 102 may process the device identifier, recognize that the first message was sent by a smart speaker and, in an example, determine what capabilities the smart speaker device 104 possesses (e.g., configured to conduct a telephone conversation, respond to voice commands, play music, display images and videos, connect to the Internet, etc.). In another example, the mobile telephone device 102 may send a follow-up second message in a wireless signal 120 to prompt the smart speaker device 104 to provide additional and more thorough capability information about the smart speaker device 104. In one example, a protocol (e.g., a Bluetooth advertisement, Wi-Fi handshake message, NFC initialization, etc.) used for the first message is less robust and more limited than a protocol used for the second message (e.g., a Wi-Fi transmission, UWB, etc.). In this way, the full capabilities of the smart speaker device 104 may be discovered by sending the second message to the mobile telephone device 102.

The capabilities of the smart speaker device 104 may include a device identifier for the smart speaker device 104, conditions/triggers that dictate when a telephone conversation is transferred to/from the mobile telephone device 102, conditions/triggers that cause the smart speaker device 104 to transfer the telephone conversation back to the mobile telephone device 102, or to some other device in system 200, etc.

In one example, the first message may be a Bluetooth advertisement, and may include a Bluetooth device identifier of the smart speaker device 104. The mobile telephone device 102 may receive the Bluetooth device identifier of the smart speaker device 104 and correlate it to a Wi-Fi identifier or some other common network identifier related to the smart speaker device 104. With this Wi-Fi identifier or common network identifier, the mobile telephone device 102 may establish a communication channel with the smart speaker device 104 using Wi-Fi or the common network, in addition to learning pertinent device capabilities of the smart speaker device 104.

In another example, the mobile telephone device 102 may send the first message, and the smart speaker device 104 may respond with a second message that includes capabilities of the smart speaker device 104.

In one approach, smart speaker device 104 and second smart speaker device 122 may be in electrical communication with one another. This communication may be initiated based on a signal 130 sent by the smart speaker device 104, by a signal 132 sent from the second smart speaker device 122, based on a combination of both signals, based on one signal sent in response to the other signal, etc. Any method of initializing a wired or wireless connection between the smart speaker devices 104, 122 may be used, as would be known to one of skill in the art. Wireless signals 130, 132 may be of any type known in the art, such as Bluetooth, Wi-Fi, NFC, UWB, a sound wave audible to humans, a sound wave inaudible to humans, etc.

In an approach, smart speaker device 104 and second smart speaker device 122 may be connected with one another via network 106. In yet another approach, smart speaker device 104 and second smart speaker device 122 may not be in electrical communication with one another, directly or through a network 106. In one example, smart speaker device 104 and/or smart speaker device 122 may utilize VOIP or some other type of Internet telephony, broadband telephony, broadband phone service, etc., to conduct a telephone conversation over IP networks, such as the Internet.

As shown in FIG. 2A, the mobile telephone device 102 is in closer proximity to the smart speaker device 104 than to the second smart speaker device 122. By discovering that the mobile telephone device 102 is proximate to the smart speaker device 104, the active telephone conversation 138 may be triggered to be transferred to the smart speaker device 104 from the mobile telephone device 102, as shown in FIG. 2A (or from the second smart speaker device 122 if the active telephone conversation 138 is being conducted on the second smart speaker device 122). Thereafter, the user may continue the telephone conversation using the smart speaker device 104 without any further interaction with the mobile telephone device 102, in some approaches.

In one approach, the active telephone conversation 138 being conducted on the mobile telephone device 102 may be automatically transferred to the smart speaker device 104 preferentially over being transferred to the second smart speaker device 122. In another approach, a message may be presented to the user to cause the transfer of the active telephone conversation 138, and the transfer may be caused by input of the user. This message may be presented on the smart speaker device 104, on the mobile telephone device 102, and/or on the laptop computer 124, in various approaches. In one example, the message may be played audibly by one of the devices. In another example, the message may be displayed by one of the devices. User input may be received via voice command, touch input, or via some other known input method, in several examples.

Now referring to FIG. 2B, the mobile telephone device 102 is in closer proximity to the second smart speaker device 122 than to the smart speaker device 104. By discovering that the mobile telephone device 102 is proximate to the second smart speaker device 122, the active telephone conversation 138 may be triggered to be transferred to the second smart speaker device 122 from the smart speaker device 104, as shown in FIG. 2B (or from the mobile telephone device 102 if the active telephone conversation 138 is being conducted on the mobile telephone device 102). Thereafter, the user may continue the telephone conversation 138 using the second smart speaker device 122 without any further interaction with the mobile telephone device 102, in some approaches.

In one approach, the active telephone conversation 138 being conducted on the smart speaker device 104 may be automatically transferred to the second smart speaker device 122 preferentially over being transferred to the mobile telephone device 102. In another approach, a message may be presented to the user to cause the transfer of the active telephone conversation 138, and the transfer may be caused by input of the user. This message may be presented on the second smart speaker device 122, on the smart speaker device 104, on the mobile telephone device 102, and/or on the laptop computer 124, in various approaches. In one example, the message may be played audibly by one of the devices. In another example, the message may be displayed by one of the devices. User input may be received via voice command, touch input, or via some other known input method, in several examples.

As shown in FIG. 2C, the mobile telephone device 102 is no longer proximate (within the predetermined distance 142) with either of the smart speaker devices 104, 122. Upon discovering that the mobile telephone device 102 is no longer proximate to the second smart speaker device 122, and determining that the mobile telephone device 102 is not proximate to the smart speaker device 104, the active telephone conversation 138 may be triggered to be transferred to the mobile telephone device 102 from the second smart speaker device 122, as shown in FIG. 2C (or from the smart speaker device 104 if the active telephone conversation 138 is being conducted on the smart speaker device 104). Thereafter, the user may continue the telephone conversation 138 using the mobile telephone device 102, in some approaches.

In one approach, the active telephone conversation 138 being conducted on the second smart speaker device 122 may be automatically transferred to the smart speaker device 104 preferentially over being transferred to the mobile telephone device 102 in cases where the mobile telephone device 102 is proximate to the smart speaker device 104. In another approach, a message may be presented to the user to cause the transfer of the active telephone conversation 138, and the transfer may be caused by input of the user. This message may be presented on the second smart speaker device 122, on the smart speaker device 104, on the mobile telephone device 102, and/or on the laptop computer 124, in various approaches. In one example, the message may be played audibly by one of the devices. In another example, the message may be displayed by one of the devices. User input may be received via voice command, touch input, or via some other known input method, in several examples.

Figure 3A:
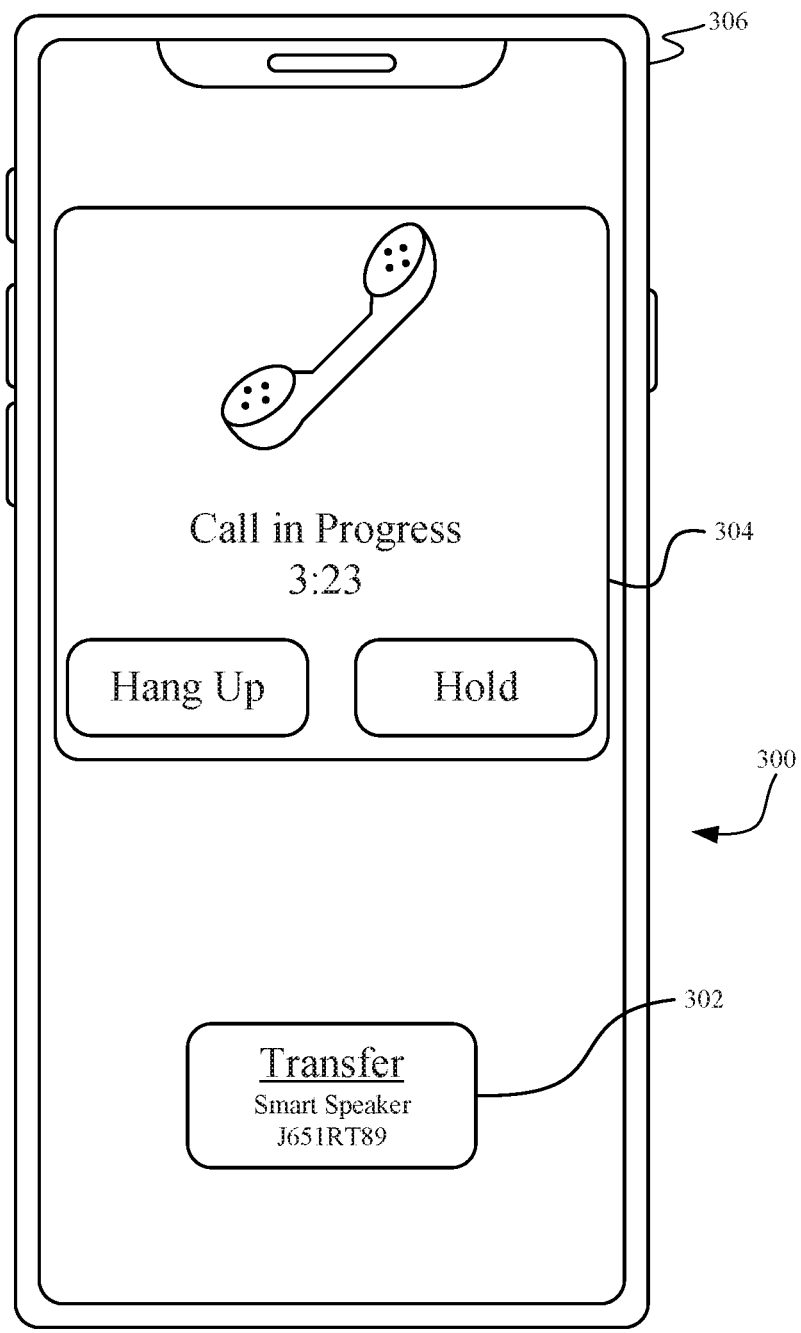
FIGS. 3A-3B illustrate example graphical user interfaces for transferring an active telephone conversation from one computing device to another computing device.

Now referring to FIG. 3A, a mobile telephone device 306 is shown having an example graphical user interface (GUI) 300 for transferring an active telephone conversation from the mobile telephone device 306 to a second computing device, such as a smart speaker device or some other computing device capable of conducting an active telephone conversation. Moreover, although the GUI 300 is shown displayed on a mobile telephone device 306, the GUI 300 may be displayed and operate on any computing device capable of conducting an active telephone conversation. For example, GUI 300 may be presented when mobile telephone device 306 determines that an active telephone conversation is being conducted on the mobile telephone device 306, and the mobile telephone device 306 is proximate to the smart speaker device. In some implementations, GUI 300 may be presented on its own screen, on a lock screen of the mobile telephone device 306, and/or over a screen or second GUI 304 indicating the active telephone conversation. Thus, a user may manipulate GUI 300 when the mobile telephone device 306 is locked and without unlocking the mobile telephone device 306 (e.g., before entering user's credentials to unlock the mobile telephone device 306).

In some implementations, GUI 300 may include graphical element 302. For example, graphical element 302 may include a prompt informing the user that manipulation of graphical element 302 will cause the mobile telephone device 306 to transfer the active telephone conversation to the detected proximate smart speaker device for continuation thereon. In an example, the prompt may include identification of the smart speaker (in FIG. 3A, the smart speaker is identified as a smart speaker having a device identifier of "J651RT89," but may have any suitable label and identifier for the detected proximate device) and/or some other information related to the active telephone conversation or devices available for transferring the active conversation.

The user may provide input (e.g., touch input) to move or manipulate graphical element 302 on GUI 300. For example, the user may provide input in the form of a long touch gesture (e.g., touch and hold for a predetermined period of time), a swipe gesture (e.g., touch and drag) in a predetermined direction (e.g., away from the user, toward the user, left or right, etc.) on the display of the mobile telephone device 306, or some other known touch input to initiate the transfer of the active telephone conversation between devices.

In an example, multiple graphical elements may be displayed simultaneously, one for each device to which the active telephone conversation may be transferred, based on a selection provided by user input. In the absence of user input, a default selection may be made automatically, in one example. An example of one arrangement having multiple devices is described in more detail with respect to FIG. 3B.

Figure 3B:
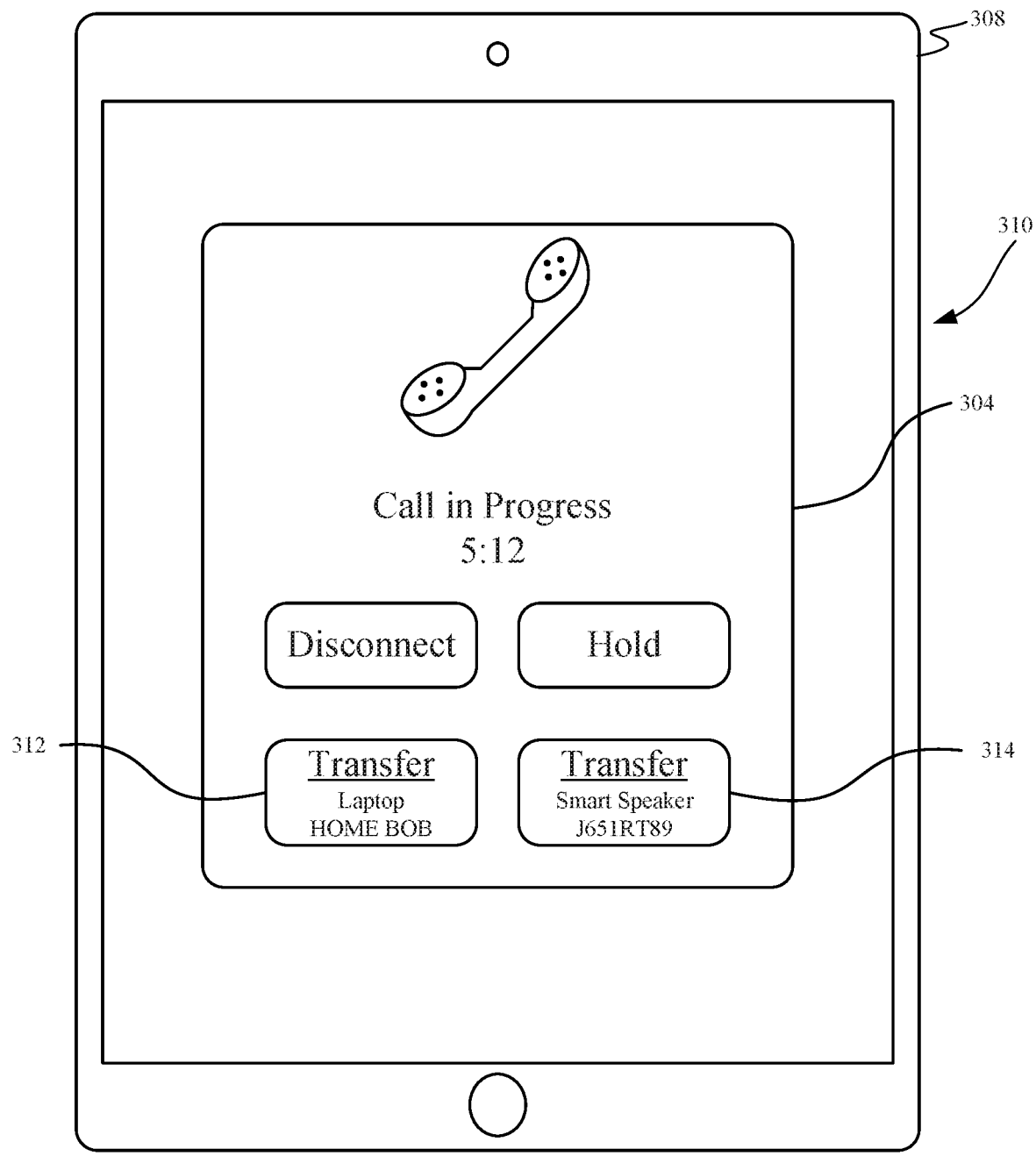

In FIG. 3B, an example GUI 310 is shown for transferring an active telephone conversation from a first computing device (shown as a tablet computer 308) to one of a set of second computing devices configure to conduct an active telephone conversation. Although the GUI 310 is shown displayed on a tablet computer 308, the GUI 310 may be displayed and operate on any computing device capable of conducting an active telephone conversation. For example, GUI 310 may be presented when the tablet computer 308 determines that an active telephone conversation is being conducted on the tablet computer 308, and the tablet computer 308 is proximate to one of the second computing devices. In some implementations, GUI 310 may be presented on its own screen, on a lock screen of the tablet computer 308, and/or over a screen or GUI 304 indicating the active telephone conversation. Thus, a user may manipulate GUI 310 when the tablet computer 308 is locked and without unlocking the tablet computer 308 (e.g., before entering user's credentials to unlock the tablet computer 308 for interaction therewith).

In some implementations, GUI 310 may include a set of graphical elements 312, 314, etc., where one graphical element is shown for each computing device capable of conducting an active telephone conversation that is detected to be proximate to the tablet computer 308. In FIG. 3B, two graphical elements are shown, but any number of graphical elements may be shown based on a number of detected proximate devices. In one example, the closest one, two, or three proximate devices may be shown, while selectively hiding any other detected proximate devices. In this way, the GUI 310 is more easy to interact with for a majority of the actions that will be taken by the user.

For example, as shown in FIG. 3B, graphical elements 312, 314 each may include a prompt informing the user that manipulation of one of the graphical elements 312, 314 will cause the tablet computer 308 to transfer the active telephone conversation to the detected proximate device identified by the selected graphical element 312 or 314 for continuation thereon. In an example, the prompt may include identification of the computing device (in FIG. 3B, graphical element 312 indicates a laptop computer having a device identifier of "HOME BOB," while graphical element 314 indicates the smart speaker identified by a device identifier of "J651RT89") and/or some other information related to the active telephone conversation or devices available for transferring the conversation.

The user may provide input (e.g., touch input) to move or manipulate one of the graphical elements 312, 314 on GUI 310. For example, the user may provide input in the form of a long touch gesture (e.g., touch and hold for a predetermined period of time), a swipe gesture (e.g., touch and drag) in a predetermined direction (e.g., away from the user, toward the user, left or right, etc.) on the display of the tablet computer 308, or some other known touch input to initiate the transfer of the active telephone conversation between the tablet computer 308 and the selected device.

Example Processes

To enable the reader to obtain a clear understanding of the technological concepts described herein, the following processes describe specific steps performed in a specific order. However, one or more of the steps of a particular process may be rearranged and/or omitted while remaining within the contemplated scope of the technology disclosed herein. Moreover, different processes, and/or steps thereof, may be combined, recombined, rearranged, omitted, and/or executed in parallel to create different process flows that are also within the contemplated scope of the technology disclosed herein. Additionally, while the processes below may omit or briefly summarize some of the details of the technologies disclosed herein for clarity, the details described in the paragraphs above may be combined with the process steps described below to get a more complete and comprehensive understanding of these processes and the technologies disclosed herein.

Figure 4:
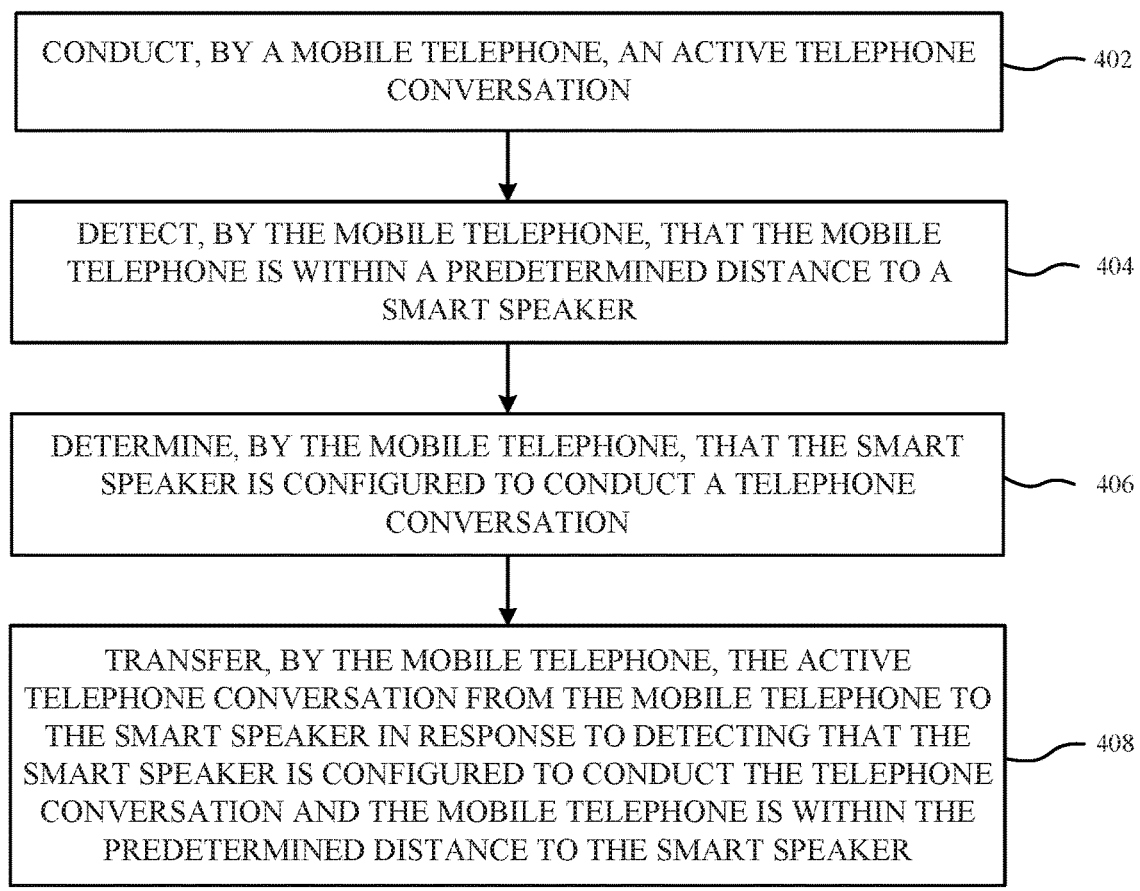
FIG. 4 is a flow diagram of an example method for managing an active telephone conversation.

FIG. 4 shows an example method 400 for managing an active telephone conversation. In operation 402, an active telephone conversation is conducted by a mobile telephone. Any other type of computing device capable of conducting a telephone conversation may be used in method 400 in various examples, such as a laptop computer, a smartphone, a tablet computer, etc.

In operation 404, the mobile telephone detects that it is within a predetermined distance to a smart speaker, e.g., proximate to the smart speaker. In an example, the predetermined distance may be a distance which ensures that voice commands and/or a conversation held by a user of the mobile telephone is able to be heard by the smart speaker, and that audio played by the smart speaker is able to be heard by the user, such that the active telephone conversation may be conducted by the smart speaker (possibly in place of the mobile telephone conducting the active telephone conversation). In several examples, the predetermined distance may be 10 meters, 6 meters, 5 meters, 3 meters, 1 meter, etc.

As shown in operation 406, the mobile telephone determines that the smart speaker is configured to conduct a telephone conversation. The determination may be made according to any of the methods described previously, or according to some method not specifically described herein.

In an example, the mobile telephone may receive a message or advertisement from the smart speaker identifying the smart speaker (the message may include basic or thorough information regarding capabilities of the smart speaker, including an ability to conduct a telephone conversation, either independently or in conjunction with the mobile telephone or some other device capable of connecting to a telephone communications network). The mobile telephone may learn of the smart speaker's capabilities from this first message, or if additional information is needed to ascertain the smart speaker's capabilities, the mobile telephone may send a follow-up message to the smart speaker to prompt a more thorough response that includes capabilities of the smart speaker, including an ability to conduct a telephone conversation.

In response to detecting that the smart speaker is configured to conduct the telephone conversation and the mobile telephone is within the predetermined distance to the smart speaker, in operation 408, the active telephone conversation is transferred from the mobile telephone to the smart speaker.

In one approach, a notification is presented on a display of the mobile telephone in response to detecting that the mobile telephone is conducting the active telephone conversation within the predetermined distance to the smart speaker. This notification is presented prior to transferring the telephone conversation to the smart speaker. The notification displays a selectable option for a user to select that causes the active telephone conversation to be transferred to the smart speaker.

Moreover, in one approach, operation 408 is performed in response to the mobile telephone receiving selection of the option to transfer the active telephone conversation to the smart speaker. If the user does not select the option to transfer the telephone conversation, it will continue to be conducted by the mobile telephone.

In an example, the notification may include identification of the smart speaker (such as a name and device identifier) and/or other information related to the active telephone conversation or the smart speaker.

In a further example, method 400 may include the mobile telephone determining a distance to the smart speaker. In an approach, the distance may be determined by measuring a strength of a signal transmitted by the smart speaker and received by the mobile telephone. In various approaches, the signal may be received via a microphone or a radio frequency (RF) channel of the mobile telephone.

In a case where the signal is an audible signal received by the microphone of the mobile telephone, the audible signal may be inaudible to humans in one approach, to avoid distracting the user conducting the telephone conversation on the mobile telephone. In a case where the signal is a RF signal received by the RF channel of the mobile telephone, the RF signal may adhere to a known protocol, such as Bluetooth, Wi-Fi, NFC, UWB, etc.

In another example, method 400 may include the mobile telephone detecting that the smart speaker is farther than a second predetermined distance from the mobile telephone. In a situation where such a determination is made, the mobile telephone may transfer the active telephone conversation from the smart speaker back to the mobile telephone. The decision of whether to transfer the telephone conversation back to the mobile telephone may depend on detecting that the smart speaker is farther than the second predetermined distance from the mobile telephone and the smart speaker is still conducting the active telephone conversation (e.g., the call has not been disconnected).

Further, in an example, method 400 may include the mobile telephone presenting a notification on a display of the mobile telephone in response to detecting that the smart speaker is farther than the second predetermined distance from the mobile telephone and the smart speaker is still conducting the active telephone conversation. In this example, the notification may include a selectable option to transfer the active telephone conversation. In response to user input selecting the option to transfer the telephone conversation, the mobile telephone may transfer the active telephone conversation from the smart speaker back to the mobile telephone. If the user does not select the option to transfer the telephone conversation, it will continue to be conducted by the smart speaker.

In another approach, method 400 may include the mobile telephone automatically transferring the active telephone conversation from the smart speaker back to the mobile telephone in response to detecting that a user has placed the mobile telephone in a position normally associated with conducting a telephone call. For example, the user may raise the mobile telephone to an ear of the user, disconnect the mobile telephone from a charging source, or perform some other action detectable by the mobile telephone that indicates that the user has chosen to continue the active conversation on the mobile telephone.

In an example, the mobile telephone may be moved around an area where multiple smart speakers are located. In this example, the mobile telephone may detect that the mobile telephone is closer to a second smart speaker than it is to the smart speaker. In response to this positional detection that the mobile telephone is closer to the second smart speaker, the mobile telephone may send a message to the smart speaker to transfer the active telephone conversation from the smart speaker to the second smart speaker. In another approach, the mobile telephone may transfer the active conversation from the smart speaker to the second smart speaker without requesting action or involvement of the smart speaker.

In an example, a mobile telephone may respond to detection of a new computing device different from how the mobile telephone responds to detection of a computing device that has already been detected by the mobile telephone. For example, if a user takes his mobile telephone into his home, where he has a smart speaker installed in the living room, it is probable that the mobile telephone has already recognized the smart speaker through previous interactions.

In this example, the mobile telephone, the smart speaker, or both devices may register relevant information about the other device (e.g., device identifier, device name, device address, network(s) on which the device is capable of communicating, capability to conduct a telephone conversation with or without assistance of another device, etc.), so that when one of the devices detects the presence of the other device, a seamless transfer of an active telephone conversation may be made that does not rely on user interaction with either device. This relevant information may be stored to a memory of the computing device for use in future interactions with the other known computing device.

Further, should the mobile telephone not recognize the smart speaker as having been previously registered, then the mobile telephone may proceed in accordance with method 400 to transfer the telephone conversation, if possible, to the smart speaker.

In a further approach, an online or cloud service or storage may be utilized to determine whether a new computing device should be allowed to receive a transferred telephone conversation. Such a computing device may be referred to as a "trusted" device, as the computing device has proven to be safe for exchanges of information in previous interactions. The online service may provide information on such trusted devices upon request by the mobile telephone when a new computing device is detected by the mobile telephone.

In another example, a friend may visit the user's home and may be talking on his smartphone. The smartphone may not be registered with the user's mobile telephone (as the friend may have never visited the user's home in the past, it may be a new smartphone for the friend, settings have changed on the smartphone since a last visit, etc.) When the smartphone is detected as being a new computing device, a guest or temporary token may be provided to the smartphone, which allows the smartphone to have a telephone conversation transferred for a limited amount of time (e.g., 1 hour, 30 minutes, 10 minutes, 5 minutes, etc.) before user input is requested (though some interface of the smart speaker or the smartphone) to continue conducting the telephone conversation on the current device. When the token expires, the smartphone is no longer allowed to have a telephone conversation automatically transferred. The transfer may include, but is not limited to, an active telephone conversation being transferred to the smartphone from the mobile telephone, an active telephone conversation being transferred from the smartphone to a smart speaker installed at the user's home, an active telephone conversation being transferred to the smartphone from the smart speaker, an active telephone conversation being transferred from the smartphone to the user's mobile telephone, etc.

Figure 5:
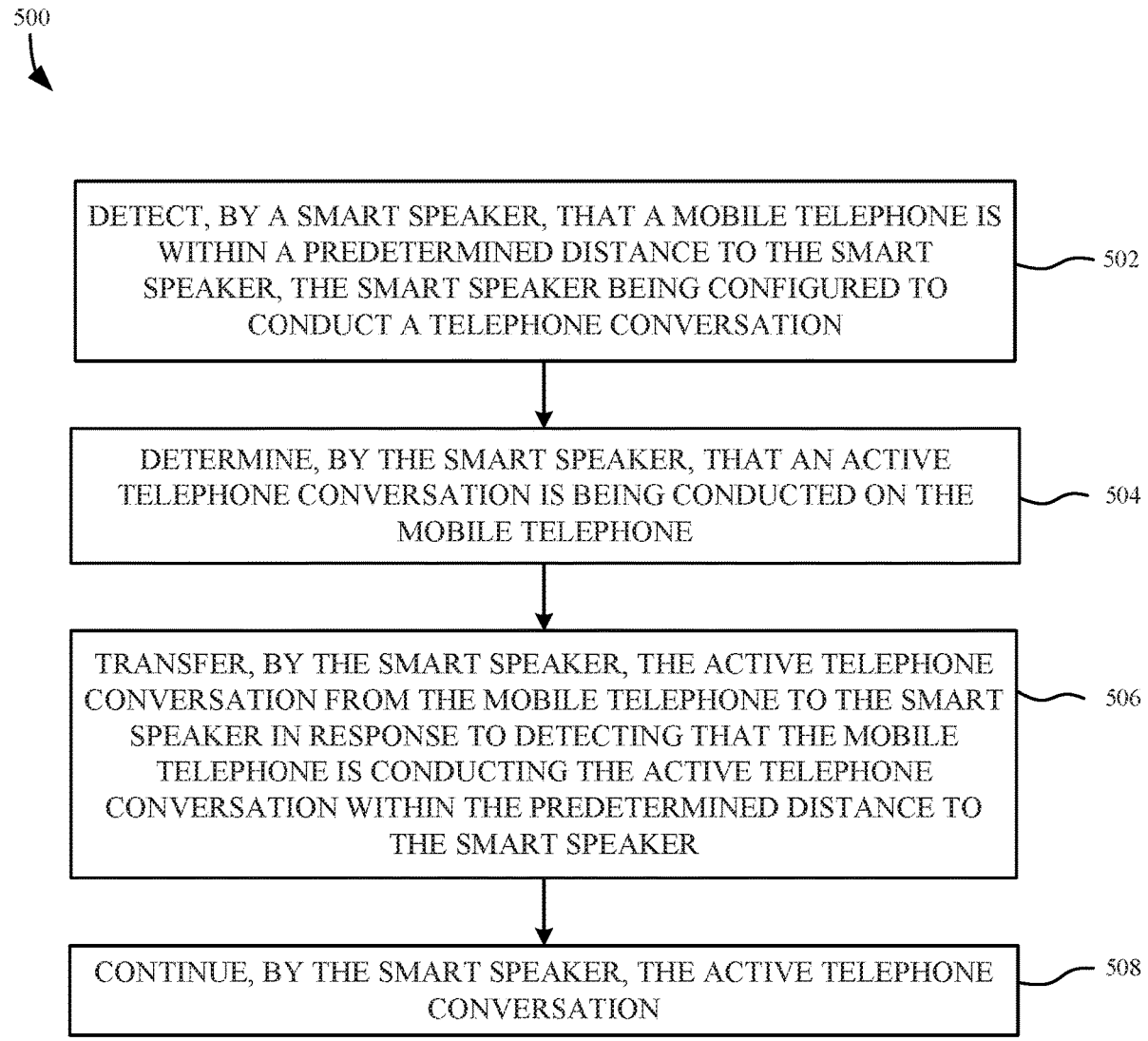
FIG. 5 is a flow diagram of another example method for managing an active telephone conversation.

FIG. 5 shows an example method 500 for managing an active telephone conversation. In operation 502, a smart speaker detects that a mobile telephone is within a predetermined distance ("proximate") to the smart speaker. In this approach, the smart speaker is configured to conduct a telephone conversation. Any other type of computing device capable of conducting a telephone conversation may be used in method 500 in various examples, such as a laptop computer, a smartphone, a tablet computer, etc.

In operation 504, the smart speaker determines that an active telephone conversation is being conducted on the mobile telephone. The determination may be made according to any of the methods described previously, or according to some method not specifically described herein.

In an example, the smart speaker may receive a message or advertisement from the mobile telephone identifying the mobile telephone (the message may include basic or thorough information regarding capabilities of the mobile telephone, including an ability to conduct a telephone conversation, either independently or in conjunction with some other device capable of connecting to a telephone communications network). The smart speaker may learn of the mobile telephone's capabilities from this first message, or if additional information is needed to ascertain the mobile telephone's capabilities, the smart speaker may send a follow-up message to the mobile telephone to prompt a more thorough response that includes capabilities of the mobile telephone, including an ability to conduct a telephone conversation.

In an example, the predetermined distance may be a distance which ensures that voice commands and/or a conversation held by a user of the smart speaker is able to be heard by a microphone of the mobile telephone, and that audio played by the mobile telephone's speaker is able to be heard by the user, such that an active telephone conversation may be conducted by the mobile telephone (possibly in place of the smart speaker conducting the active telephone conversation). In several examples, the predetermined distance may be 10 meters, 6 meters, 5 meters, 3 meters, 1 meter, etc.

The smart speaker transfers the active telephone conversation from the mobile telephone to the smart speaker in operation 506. The transfer may be performed in response to detecting that the mobile telephone is conducting the active telephone conversation within the predetermined distance to the smart speaker, in an example.

In operation 508, the smart speaker continues the active telephone conversation, after having been transferred to the smart speaker from the mobile telephone.

In a further example, method 500 may include the smart speaker determining a distance to the mobile telephone. In an approach, the distance may be determined by measuring a strength of a signal transmitted by the mobile telephone and received by the smart speaker. In various approaches, the signal may be received via a microphone or a RF channel of the smart speaker.

In a case where the signal is an audible signal received by the microphone of the smart speaker, the audible signal may be inaudible to humans in one approach, to avoid distracting the user conducting the telephone conversation on the smart speaker or mobile telephone. In a case where the signal is a RF signal received by the RF channel of the smart speaker, the RF signal may adhere to a known protocol, such as Bluetooth, Wi-Fi, NFC, UWB, etc.

In another example, method 500 may include the smart speaker detecting that the mobile telephone is farther than a second predetermined distance from the smart speaker. In a situation where such a determination is made, the smart speaker may transfer the active telephone conversation from the smart speaker back to the mobile telephone. The decision of whether to transfer the telephone conversation back to the mobile telephone may depend on detecting that the mobile telephone is farther than the second predetermined distance from the smart speaker and the smart speaker is still conducting the active telephone conversation (e.g., the call has not been disconnected).

In one approach, a notification is presented to the user with a selectable option to cause the telephone conversation to be transferred in response to detecting that the smart speaker is conducting the active telephone conversation and the mobile telephone is farther than the second predetermined distance from the smart speaker. In an example, the smart speaker may send a notification to the mobile telephone to be presented on a display of the mobile telephone. In an example, the smart speaker may request that the mobile telephone present a display which is resident on the mobile telephone. This notification is presented prior to transferring the telephone conversation back to the mobile telephone. The notification displays a selectable option for a user to select that causes the active telephone conversation to be transferred to the mobile telephone.

Moreover, in one approach, the active telephone conversation may be transferred from the smart speaker to the mobile telephone in response to receiving selection of the option to transfer the active telephone conversation. If the user does not select the option to transfer the telephone conversation, it will continue to be conducted by the smart speaker.

In another approach, method 500 may include the smart speaker automatically transferring the active telephone conversation from the smart speaker back to the mobile telephone in response to detecting that a user has placed the mobile telephone in a position normally associated with conducting a telephone call. For example, the user may raise the mobile telephone to an ear of the user, disconnect the mobile telephone from a charging source, or perform some other action detectable by the mobile telephone that indicates that the user has chosen to continue the active conversation on the mobile telephone.

In an example, the mobile telephone may be moved around an area where multiple smart speakers are located. In this example, the smart speaker may receive a message indicating that the mobile telephone is closer to a second smart speaker than the smart speaker. Further, the smart speaker may transfer the active telephone conversation from the smart speaker to the second smart speaker. In an approach, this transfer may be performed in response to receiving the message indicating that the mobile telephone is closer to the second smart speaker. In another approach, the smart speaker may detect a location of the mobile telephone, and perform the transfer to the second smart speaker without input from the mobile telephone.

In an example, a smart speaker may respond to detection of a new computing device different from how the smart speaker responds to detection of a computing device that has already been detected by the smart speaker. For example, if a user takes a mobile telephone into his home, where he has the smart speaker installed in a room of the home, it is probable that the smart speaker has already recognized the mobile telephone through previous interactions.

In this example, the mobile telephone, the smart speaker, or both devices may register relevant information about the other device (e.g., device identifier, device name, device address, network(s) on which the device is capable of communicating, capability to conduct a telephone conversation with or without assistance of another device, etc.), so that when one of the devices detects the presence of the other device, a seamless transfer of an active telephone conversation may be made that does not rely on user interaction with either device. This relevant information may be stored to a memory of the computing device for use in future interactions with the other known computing device.

Further, should the smart speaker not recognize the mobile telephone as having been previously registered, then the smart speaker may proceed in accordance with method 500 to pull the telephone conversation, if possible, from the mobile telephone to the smart speaker.

In a further approach, an online or cloud service or storage may be utilized to determine whether a new computing device should be allowed to receive a transferred telephone conversation. Such a computing device may be referred to as a "trusted" device, as the computing device has proven to be safe for exchanges of information in previous interactions. The online service may provide information on such trusted devices upon request by the smart speaker when a new computing device is detected by the smart speaker.

In another example, a friend may visit the user's home and may be talking on his smartphone. The smartphone may not be registered with the user's smart speaker (as the friend may have never visited the user's home in the past, it may be a new smartphone for the friend, settings have changed on the smartphone since a last visit, etc.) When the smartphone is detected as being a new computing device, a guest or temporary token may be provided to the smartphone, which allows the smartphone to have a telephone conversation transferred thereto from the smart speaker, or to transfer an active telephone conversation to the smart speaker, for a limited amount of time (e.g., 1 hour, 30 minutes, 10 minutes, 5 minutes, etc.) before user input is requested (though some interface of the smart speaker or the smartphone) to continue conducting the telephone conversation on the current device. When the token expires, the smartphone is no longer allowed to have a telephone conversation automatically transferred.

Figure 6:
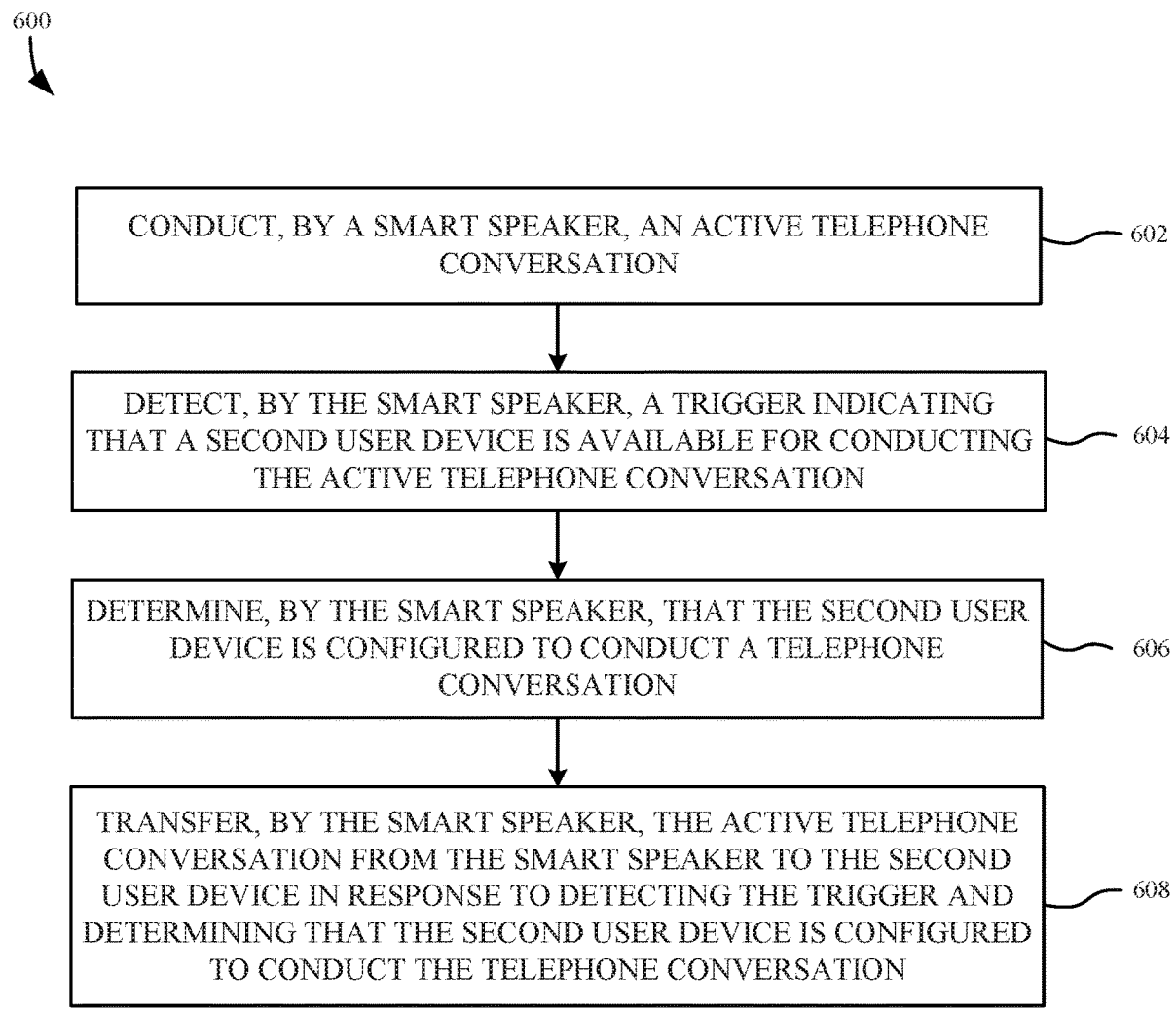
FIG. 6 is a flow diagram of another example method for managing an active telephone conversation.

FIG. 6 shows an example method 600 for managing an active telephone conversation. In operation 602, a smart speaker conducts an active telephone conversation. The smart speaker is configured to conduct a telephone conversation alone or with the aid of another device in electrical communication with the smart speaker, such as a mobile telephone, a laptop computer, a smartphone, a tablet computer, etc.

Method 600 may be used in conjunction with methods 400 and/or 500 as described in FIGS. 4 and 5, respectively, to initially transfer a telephone conversation to the smart speaker, in one approach. In another approach, the smart speaker may originate the active telephone conversation or receive the active telephone conversation through some other method.

Referring again to FIG. 6, in operation 604, the smart speaker detects a trigger that indicates that a second user device is available for conducting the active telephone conversation. Some example triggers include, but are not limited to, a message being received by the smart speaker from the second user device, movement of the user through an area where the second user device is located, user input indicating a desire for the user to continue the active telephone conversation on another device, e.g., the second user device, etc.

Any type of second user device may be used in method 600 including, but not limited to, a mobile telephone, a laptop computer, a second smart speaker, a car audio system, a smartphone, a tablet computer, etc.

In an example, the smart speaker may receive a message or advertisement from the second user device identifying the second user device (the message may include basic or thorough information regarding capabilities of the second user device, including an ability to conduct a telephone conversation, either independently or in conjunction with some other device capable of connecting to a telephone communications network). The smart speaker may learn of the second user device's capabilities from this first message, or if additional information is needed to ascertain the second user device's capabilities, the smart speaker may send a follow-up message to the second user device to prompt a more thorough response that includes capabilities of the second user device, including an ability to conduct a telephone conversation.

In an example, the trigger may include moving a first user device typically carried or worn by the user, e.g., a mobile telephone, smartwatch, fitness tracker, etc., to within a predetermined distance from the second user device. The predetermined distance may be a distance which ensures that voice commands and/or a conversation held by a user of the smart speaker is able to be heard by a microphone of the second user device, and that audio played by the second user device's speaker is able to be heard by the user, such that an active telephone conversation may be conducted by the second user device (possibly in place of the smart speaker conducting the active telephone conversation). In several examples, the predetermined distance may be 10 meters, 6 meters, 6 meters, 3 meters, 1 meter, etc.

In operation 606, the smart speaker determines that the second user device is configured to conduct a telephone conversation. This determination is made prior to the smart speaker attempting to transfer the active telephone conversation to the second user device. The determination may be made using an exchange of one or more messages to and/or from the second user device and the smart speaker, identification of the second user device by the smart speaker as being a recognized device previously used to conduct a telephone conversation, active polling of the second user device by the smart speaker for capabilities of the second user device, etc.

In operation 608, the smart speaker transfers the active telephone conversation to the second user device. The transfer may be performed in response to detecting that the second user device is capable of conducting the active telephone conversation and that the trigger condition has been met, such as the user being within the predetermined distance to the second user device, in an example.

After transferring the active telephone conversation, the second user device may continue the active telephone conversation, alone or with the aid of another electronic device capable of conducting a telephone conversation, such as the smart speaker, a mobile telephone, etc.

In a further example, the smart speaker may determine a distance to the second user device. In an approach, the distance may be determined by measuring a strength of a signal transmitted by the second user device and received by the smart speaker. In various approaches, the signal may be received via a microphone or a RF channel of the smart speaker.

In a case where the signal is an audible signal received by the microphone of the smart speaker, the audible signal may be inaudible to humans in one approach, to avoid distracting the user conducting the telephone conversation on the smart speaker or mobile telephone. In a case where the signal is a RF signal received by the RF channel of the smart speaker, the RF signal may adhere to a known protocol, such as Bluetooth, Wi-Fi, NFC, UWB, etc.

In another example, method 600 may include the smart speaker detecting that the second user device is farther than a second predetermined distance from the smart speaker. In a situation where such a determination is made, the smart speaker may transfer the active telephone conversation from the second user device back to the smart speaker. The decision of whether to transfer the telephone conversation back to the smart speaker may depend on detecting that the second user device is farther than the second predetermined distance from the smart speaker, the user is closer to the smart speaker, and the second user device is still conducting the active telephone conversation (e.g., the call has not been disconnected).

In one approach, a notification is presented to the user with a selectable option to cause the telephone conversation to be transferred. In an example, the smart speaker may send a notification to a mobile telephone or some other device typically carried or worn by the user, to be presented on a display of the mobile telephone. In an example, the smart speaker may request that the mobile telephone present a display which is resident on the mobile telephone. This notification is presented prior to transferring the active telephone conversation from the smart speaker to the second user device or to the mobile telephone. The notification displays a selectable option for a user to select that causes the active telephone conversation to be transferred.

In another approach, method 600 may include the smart speaker automatically transferring the active telephone conversation from the smart speaker to the second user device. For example, the user may move into another room that includes the second user device, and the smart speaker may detect the user being in the other room (using any available information or data source, such as a motion sensor, speaker of devices to detect noise levels, user input to the second user device, movement of a first user device, etc.). In response to detecting this movement of the user, the smart speaker may automatically transfer the active telephone conversation to the second user device to continue the conversation.

Graphical User Interfaces

This disclosure above describes various Graphical User Interfaces (GUIs) for implementing various features, processes or workflows. These GUIs can be presented on a variety of electronic devices including but not limited to laptop computers, desktop computers, computer terminals, television systems, tablet computers, eBook readers, and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers to "select" or "selecting" user interface elements in a GUI, these terms are understood to include clicking, lingering, and/or hovering with a mouse, trackpad, touchscreen, or other input device over a user interface element, or touching, tapping or gesturing with one or more fingers or stylus on a user interface element. User interface elements can be virtual buttons, menus, selectors, switches, sliders, scrubbers, knobs, toggles, thumbnails, links, icons, radio buttons, checkboxes and any other mechanism for receiving input from, or providing feedback to a user.

Privacy

As described above, one aspect of the present technology is the gathering and use of data available from various sources to transfer an active telephone conversation between computing devices. The present disclosure contemplates that in some instances, this gathered data may include personal information data that uniquely identifies or can be used to contact or locate a specific person. Such personal information data can include demographic data, location-based data, telephone numbers, email addresses, social media identifiers, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to determine how a user wants media content to be delivered, and a personal setting for how and when to transfer an active telephone conversation between computing devices. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, for media content advertising purposes, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an application that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, an active telephone conversation may still be transferred between computing devices by inferring preferences based on non-personal information data or a bare minimum amount of personal information, such as the content being requested by the device associated with a user, other non-personal information available to the device, or publicly available information.

Example System Architecture

Figure 7:
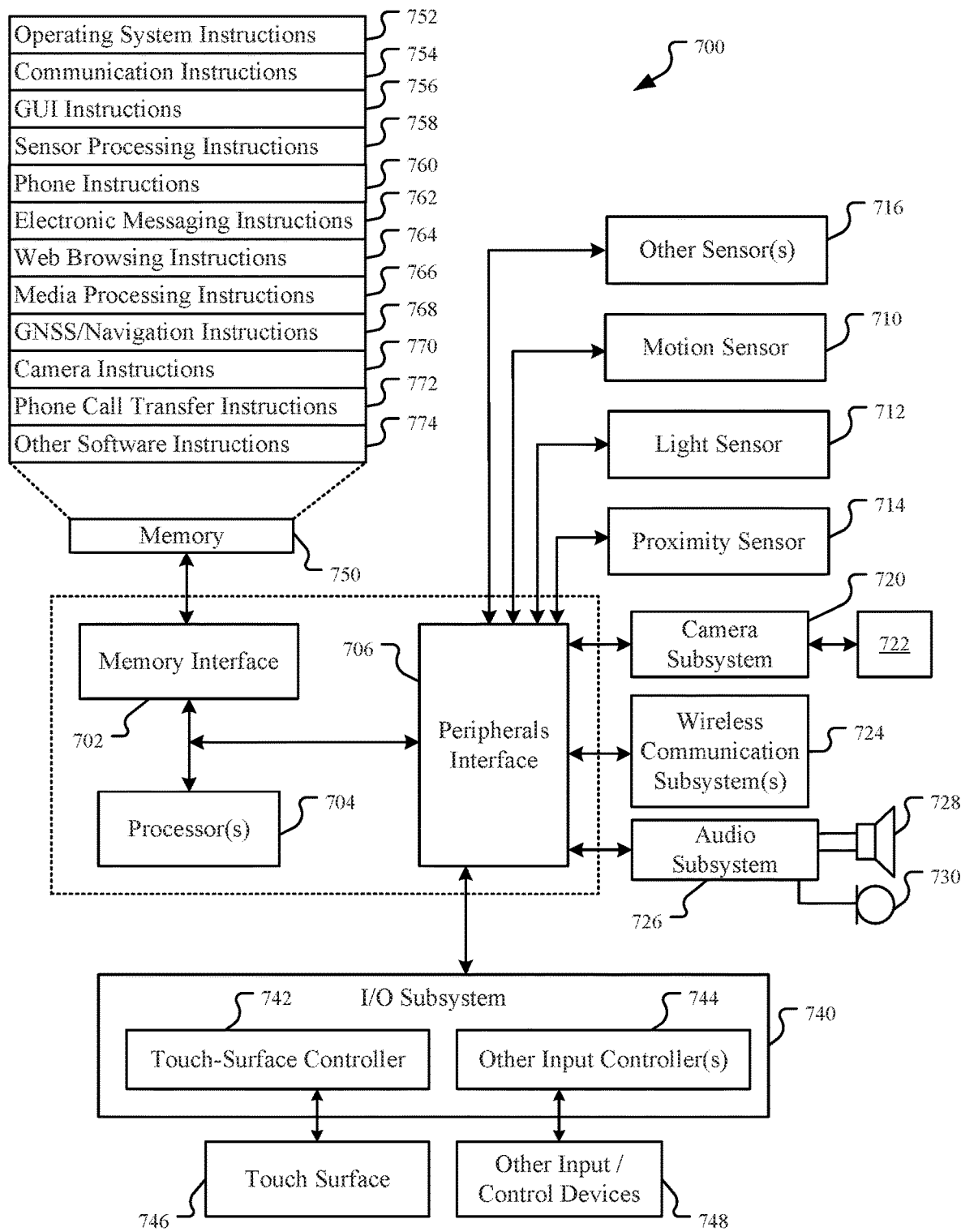
FIG. 7 is a block diagram of an example computing device that may implement the features and processes of FIGS. 1-6.

FIG. 7 is a block diagram of an example computing device 700 that can implement the features and processes of FIGS. 1-6. Referring again to FIG. 7, the computing device 700 can include a memory interface 702, one or more data processors, image processors and/or central processing units 704, and a peripherals interface 706. The memory interface 702, the one or more processors 704 and/or the peripherals interface 706 can be separate components or can be integrated in one or more integrated circuits. The various components in the computing device 700 can be coupled by one or more communication buses or signal lines.

Sensors, devices, and subsystems can be coupled to the peripherals interface 706 to facilitate multiple functionalities. For example, a motion sensor 710, a light sensor 712, and a proximity sensor 714 can be coupled to the peripherals interface 706 to facilitate orientation, lighting, and proximity functions. Other sensors 716 can also be connected to the peripherals interface 706, such as a global navigation satellite system (GNSS) (e.g., GPS receiver), a temperature sensor, a biometric sensor, magnetometer or other sensing device, to facilitate related functionalities.

A camera subsystem 720 and an optical sensor 722, e.g., a charged coupled device (CCD) or a complementary metal-oxide semiconductor (CMOS) optical sensor, can be utilized to facilitate camera functions, such as recording photographs and video clips. The camera subsystem 720 and the optical sensor 722 can be used to collect images of a user to be used during authentication of a user, e.g., by performing facial recognition analysis.

Communication functions can be facilitated through one or more wireless communication subsystems 724, which can include radio frequency receivers and transmitters and/or optical (e.g., infrared) receivers and transmitters. The specific design and implementation of the communication subsystem 724 can depend on the communication network(s) over which the computing device 700 is intended to operate. For example, the computing device 700 can include communication subsystems 724 designed to operate over a GSM network, a GPRS network, an EDGE network, a Wi-Fi or WiMax network, and a Bluetooth™ network. In particular, the wireless communication subsystems 724 can include hosting protocols such that the device 100 can be configured as a base station for other wireless devices.

An audio subsystem 726 can be coupled to a speaker 728 and a microphone 730 to facilitate voice-enabled functions, such as speaker recognition, voice replication, digital recording, and telephony functions. The audio subsystem 726 can be configured to facilitate processing voice commands, voiceprinting and voice authentication, for example.

The I/O subsystem 740 can include a touch-surface controller 742 and/or other input controller(s) 744. The touch-surface controller 742 can be coupled to a touch surface 746. The touch surface 746 and touch-surface controller 742 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 746.

The other input controller(s) 744 can be coupled to other input/control devices 748, such as one or more buttons, rocker switches, thumb-wheel, infrared port, USB port, and/or a pointer device such as a stylus. The one or more buttons (not shown) can include an up/down button for volume control of the speaker 728 and/or the microphone 730.

In one implementation, a pressing of the button for a first duration can disengage a lock of the touch surface 746; and a pressing of the button for a second duration that is longer than the first duration can turn power to the computing device 700 on or off. Pressing the button for a third duration can activate a voice control, or voice command, module that enables the user to speak commands into the microphone 730 to cause the device to execute the spoken command. The user can customize a functionality of one or more of the buttons. The touch surface 746 can, for example, also be used to implement virtual or soft buttons and/or a keyboard.

In some implementations, the computing device 700 can present recorded audio and/or video files, such as MP3, AAC, and MPEG files. In some implementations, the computing device 700 can include the functionality of an MP3 player, such as an iPod™.

The memory interface 702 can be coupled to memory 750. The memory 750 can include high-speed random-access memory and/or non-volatile memory, such as one or more magnetic disk storage devices, one or more optical storage devices, and/or flash memory (e.g., NAND, NOR). The memory 750 can store an operating system 752, such as Darwin, RTXC, LINUX, UNIX, OS X, WINDOWS, or an embedded operating system such as VxWorks.

The operating system 752 can include instructions for handling basic system services and for performing hardware dependent tasks. In some implementations, the operating system 752 can be a kernel (e.g., UNIX kernel). In some implementations, the operating system 752 can include instructions for performing voice authentication. For example, operating system 752 can implement the active telephone conversation transfer, as described with reference to FIGS. 1-6.

Referring again to FIG. 7, the memory 750 can also store communication instructions 754 to facilitate communicating with one or more additional devices, one or more computers and/or one or more servers. The memory 750 can include graphical user interface instructions 756 to facilitate graphic user interface processing; sensor processing instructions 758 to facilitate sensor-related processing and functions; phone instructions 760 to facilitate phone-related processes and functions; electronic messaging instructions 762 to facilitate electronic-messaging related processes and functions; web browsing instructions 764 to facilitate web browsing-related processes and functions; media processing instructions 766 to facilitate media processing-related processes and functions; GNSS/Navigation instructions 768 to facilitate GNSS and navigation-related processes and instructions; and/or camera instructions 770 to facilitate camera-related processes and functions.

The memory 750 can store software instructions 772 to facilitate other processes and functions, such as the transfer of an active telephone conversation between devices as described with reference to FIGS. 1-6.

Referring again to FIG. 7, the memory 750 can also store other software instructions 764, such as web video instructions to facilitate web video-related processes and functions; and/or web shopping instructions to facilitate web shopping-related processes and functions. In some implementations, the media processing instructions 766 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 750 can include additional instructions or fewer instructions. Furthermore, various functions of the computing device 700 can be implemented in hardware and/or in software, including in one or more signal processing and/or application specific integrated circuits.

What is claimed is:

1. A method comprising:
   conducting, by a mobile telephone, an active telephone conversation;
   detecting, by the mobile telephone, that the mobile telephone is within a predetermined distance to a plurality of smart speakers;
   determining, by the mobile telephone, that the mobile telephone is closest to a first smart speaker of the plurality of smart speakers;
   determining, by the mobile telephone, whether that the first smart speaker is configured to conduct a telephone conversation;
   displaying, by the mobile telephone, a notification on a display of the mobile telephone in response to detecting that the mobile telephone is conducting the active telephone conversation within the predetermined distance to the first smart speaker, wherein the notification displays a selectable option to transfer the active telephone conversation; and
   transferring, by the mobile telephone, the active telephone conversation from the mobile telephone to the first smart speaker in response to:
   a) detecting that the first smart speaker is configured to conduct the telephone conversation without aid of the mobile telephone;
   b) detecting that the mobile telephone is within the predetermined distance to the first smart speaker;
   c) detecting that the mobile telephone is closest to the first smart speaker than any other smart speaker of the plurality of smart speakers, and
   d) receiving selection of the option to transfer the active telephone conversation, wherein the first smart speaker conducts the telephone conversation independent of the mobile telephone subsequent to the transferring.

2. The method as recited in claim 1, further comprising determining, by the mobile telephone, a distance to the first smart speaker by measuring a strength of a signal transmitted by the first smart speaker, the signal being received via a microphone or a radio frequency receiver of the mobile telephone, wherein the first smart speaker comprises at least one speaker and at least one microphone, wherein the mobile telephone directly transfers the active telephone conversation to the first smart speaker.

3. The method as recited in claim 1, further comprising:
subsequent to transferring the active telephone conversation: detecting, by the mobile telephone, that the first smart speaker is farther than a second predetermined distance from the mobile telephone; and
transferring, by the mobile telephone, the active telephone conversation from the first smart speaker back to the mobile telephone in response to detecting that:
the first smart speaker is farther than the second predetermined distance from the mobile telephone; and
the first smart speaker is conducting the active telephone conversation.

4. The method as recited in claim 3, further comprising:
presenting, by the mobile telephone, a notification on a display of the mobile telephone while the mobile telephone is in a locked state in response to detecting that:
the first smart speaker is farther than the second predetermined distance from the mobile telephone; and
the first smart speaker is conducting the active telephone conversation.

5. The method as recited in claim 4, wherein the notification includes a selectable option to transfer the active telephone conversation, and wherein the transferring the active telephone conversation from the first smart speaker back to the mobile telephone is further in response to receiving selection of the option to transfer the active telephone conversation.

6. The method as recited in claim 1, further comprising:
automatically transferring, by the mobile telephone, the active telephone conversation from the first smart speaker back to the mobile telephone in response to detecting that a user has placed the mobile telephone in a position normally associated with conducting a telephone call.

7. The method as recited in claim 1, further comprising:
detecting, by the mobile telephone, that the mobile telephone is closer to a second smart speaker of the plurality of smart speakers than it is to the first smart speaker; and
sending, by the mobile telephone, a message to the first smart speaker to transfer the active telephone conversation from the first smart speaker to the second smart speaker in response to detecting that the mobile telephone is closer to the second smart speaker than to the first smart speaker.

8. The method as recited in claim 1, further comprising:
detecting, by the mobile telephone, a position of the mobile telephone,
wherein the transferring the active telephone conversation from the mobile telephone to the first smart speaker is further in response to detecting that a user has placed the mobile telephone in a resting position proximate to the first smart speaker.

9. A method comprising:
detecting, by a smart speaker, that a mobile telephone is within a predetermined distance and closer to the smart speaker than a second smart speaker, the smart speaker and the second smart speaker each being configured to conduct a telephone conversation, wherein the smart speaker is configured to conduct the telephone conversation without aid of the mobile telephone;
determining, by the smart speaker, that an active telephone conversation is being conducted on the mobile telephone;
sending, by the smart speaker, a notification to be presented on a display of the mobile telephone in response to detecting that the mobile telephone is conducting the active telephone conversation within the predetermined distance to the smart speaker, wherein the notification displays a selectable option to transfer the active telephone conversation;
transferring, by the smart speaker, the active telephone conversation from the mobile telephone to the smart speaker in response to detecting that:
a) the mobile telephone is conducting the active telephone conversation within the predetermined distance to the smart speaker;
b) the mobile telephone is closer to the smart speaker than the second smart speaker; and
c) the option to transfer the active telephone conversation has been selected; and
conducting and continuing, by the smart speaker, the active telephone conversation independently of the mobile telephone.

10. The method as recited in claim 9, further comprising determining, by the smart speaker, a distance to the mobile telephone by measuring a strength of a signal transmitted by the mobile telephone, the signal being received via a microphone or a radio frequency receiver of the smart speaker, wherein the smart speaker directly transfers the active telephone conversation from the mobile telephone.

11. The method as recited in claim 9, further comprising:
subsequent to transferring the active telephone conversation: detecting, by the smart speaker, that the mobile telephone is farther than a second predetermined distance from the smart speaker; and
transferring, by the smart speaker, the active telephone conversation from the smart speaker to the mobile telephone in response to detecting that:
the mobile telephone is farther than the second predetermined distance from the smart speaker; and
the smart speaker is conducting the active telephone conversation.

12. The method as recited in claim 11, further comprising:
sending, by the smart speaker, a notification to be presented on a display of the mobile telephone in response to detecting that:
the mobile telephone is farther than the second predetermined distance from the smart speaker; and
the smart speaker is conducting the active telephone conversation.

13. The method as recited in claim 12, wherein the notification includes a selectable option to transfer the active telephone conversation, and wherein the transferring the active telephone conversation from the smart speaker to the mobile telephone is further in response to receiving selection of the option to transfer the active telephone conversation.

14. The method as recited in claim 9, further comprising:
automatically transferring, by the smart speaker, the active telephone conversation from the smart speaker to the mobile telephone in response to detecting that a user has placed the mobile telephone in a position normally associated with conducting a telephone call.

15. The method as recited in claim 9, further comprising:
receiving, by the smart speaker, a message indicating that the mobile telephone is closer to the second smart speaker than it is to the smart speaker; and
transferring, by the smart speaker, the active telephone conversation from the smart speaker to the second smart speaker in response to receiving the message indicating that the mobile telephone is closer to the second smart speaker.

16. The method as recited in claim 9, wherein the smart speaker determines a distance to the mobile telephone using near field communication (NFC).

17. A system comprising:
a processor; and
one or more sets of instructions that when executed by the processor, cause:
conducting, by a mobile telephone, an active telephone conversation;
detecting, by the mobile telephone, that the mobile telephone is within a predetermined distance to a plurality of smart speakers;
determining, by the mobile telephone, that the mobile telephone is closest to a first smart speaker of the plurality of smart speakers;
determining, by the mobile telephone, whether that the first smart speaker is configured to conduct a telephone conversation;
displaying, by the mobile telephone, a notification on a display of the mobile telephone in response to detecting that the mobile telephone is conducting the active telephone conversation within the predetermined distance to the first smart speaker, wherein the notification displays a selectable option to transfer the active telephone conversation; and
transferring, by the mobile telephone, the active telephone conversation from the mobile telephone directly to the first smart speaker in response to detecting that:
a) detecting that the first smart speaker is configured to conduct the telephone conversation without aid of the mobile telephone;
b) detecting that the mobile telephone is within the predetermined distance to the first smart speaker;
c) detecting that the mobile telephone is closest to the first smart speaker than any other smart speaker of the plurality of smart speakers, and
d) receiving selection of the option to transfer the active telephone conversation,
wherein the first smart speaker conducts the telephone conversation independent of the mobile telephone subsequent to the transferring.

18. A system comprising:
a processor; and
one or more sets of instructions that when executed by the processor, cause:
detecting, by a smart speaker, that a mobile telephone is within a predetermined distance and closer to the smart speaker than a second smart speaker, the smart speaker and the second smart speaker each being configured to conduct a telephone conversation, wherein the smart speaker is configured to conduct the telephone conversation independently of the mobile telephone;
determining, by the smart speaker, that an active telephone conversation is being conducted on the mobile telephone;
sending, by the smart speaker, a notification to be presented on a display of the mobile telephone in response to detecting that the mobile telephone is conducting the active telephone conversation within the predetermined distance to the smart speaker, wherein the notification displays a selectable option to transfer the active telephone conversation;
transferring, by the smart speaker, the active telephone conversation from the mobile telephone directly to the smart speaker in response to detecting that:
a) the mobile telephone is conducting the active telephone conversation within the predetermined distance to the smart speaker;
b) the mobile telephone is closer to the smart speaker than the second smart speaker; and
c) the option to transfer the active telephone conversation has been selected; and
managing and continuing, by the smart speaker, the active telephone conversation independently of the mobile telephone.

* * * * *